United States Patent
Passmore

(10) Patent No.: US 8,730,232 B2
(45) Date of Patent: May 20, 2014

(54) DIRECTOR-STYLE BASED 2D TO 3D MOVIE CONVERSION SYSTEM AND METHOD

(75) Inventor: Charles Passmore, San Diego, CA (US)

(73) Assignee: Legend3D, Inc., San Diego, CA (US)

( * ) Notice: Subject to any disclaimer, the term of this patent is extended or adjusted under 35 U.S.C. 154(b) by 342 days.

(21) Appl. No.: 13/019,171

(22) Filed: Feb. 1, 2011

(65) Prior Publication Data

US 2012/0194506 A1   Aug. 2, 2012

(51) Int. Cl.
*G06T 15/00* (2011.01)

(52) U.S. Cl.
USPC .......................................................... 345/419

(58) Field of Classification Search
USPC ............... 345/419, 427; 382/154; 348/42–48, 348/96–112; 715/848
See application file for complete search history.

(56) References Cited

U.S. PATENT DOCUMENTS

| | | | |
|---|---|---|---|
| 2,593,925 A | 4/1952 | Sheldon | |
| 2,799,722 A | 7/1957 | Neugebauer | |
| 2,804,500 A | 8/1957 | Giacoletto | |
| 2,874,212 A | 2/1959 | Bechley | |
| 2,883,763 A | 4/1959 | Schaper | |
| 2,974,190 A | 3/1961 | Fine et al. | |
| 3,005,042 A | 10/1961 | Horsley | |
| 3,258,528 A | 6/1966 | Oppenheimer | |
| 3,486,242 A | 12/1969 | Aronson | |
| 3,551,589 A | 12/1970 | Moskoviz | |
| 3,558,811 A | 1/1971 | Montevecchio et al. | |
| 3,560,644 A | 2/1971 | Petrocelli et al. | |
| 3,595,987 A | 7/1971 | Vlahos | |
| 3,603,962 A | 9/1971 | Lechner | |
| 3,612,755 A | 10/1971 | Tadlock | |
| 3,617,626 A | 11/1971 | Bluth et al. | |

(Continued)

FOREIGN PATENT DOCUMENTS

| | | |
|---|---|---|
| DE | 003444353 | 6/1986 |
| EP | 0302454 | 8/1989 |

(Continued)

OTHER PUBLICATIONS

Ohm et al., An Object-Based System for Stereoscopic Viewpoint Synthesis, IEEE transaction on Circuits and Systems for Video Technology, vol. 7, No. 5, Oct. 1997, pp. 801-811.

(Continued)

*Primary Examiner* — Tung Vo
*Assistant Examiner* — Rowina Cattungal
(74) *Attorney, Agent, or Firm* — Arc IP Law, PC; Joseph J. Mayo

(57) ABSTRACT

Automated or semi-automated conversion of 2D movies into 3D movies through generation and use of director-style statistics or characteristics to determine which processes to apply to convert regions of images based on the director's movie making style, without requiring the creation, moving or reshaping of masks. System works by breaking a movie down into scenes and shots and identifying lighting, lens, camera moves and color schemes habitually utilized by a director. The characteristics or statistical information is stored in a database accessible by a computer over a network for example. Swarms of computers or any other architecture employing any required amount of computing power allows for the desired speed of conversion to take place. Once a director's style has been analyzed, embodiments utilize the director-style characteristics to determine the specific processes to utilize to convert the movie from 2D to 3D.

23 Claims, 24 Drawing Sheets
(21 of 24 Drawing Sheet(s) Filed in Color)

(56) References Cited

U.S. PATENT DOCUMENTS

| | | |
|---|---|---|
| 3,619,051 A | 11/1971 | Wright |
| 3,621,127 A | 11/1971 | Hope |
| 3,647,942 A | 3/1972 | Siegel |
| 3,673,317 A | 6/1972 | Newell et al. |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reiffel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Daike et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor et al. |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingemann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,055,939 A | 10/1991 | Karamon et al. |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,243,460 A | 9/1993 | Kornberg |
| 5,252,953 A | 10/1993 | Sandrew et al. |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,363,476 A | 11/1994 | Kurashige et al. |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,668,605 A | 9/1997 | Nachshon et al. |
| 5,673,081 A | 9/1997 | Yamashita et al. |
| 5,682,437 A | 10/1997 | Okino et al. |
| 5,684,715 A | 11/1997 | Palmer |
| 5,699,443 A | 12/1997 | Murata et al. |
| 5,699,444 A | 12/1997 | Palm |
| 5,717,454 A | 2/1998 | Adolphi et al. |
| 5,729,471 A | 3/1998 | Jain et al. |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,777,666 A | 7/1998 | Tanase et al. |
| 5,778,108 A | 7/1998 | Coleman |
| 5,784,175 A | 7/1998 | Lee |
| 5,784,176 A | 7/1998 | Narita |
| 5,808,664 A | 9/1998 | Yamashita et al. |
| 5,825,997 A | 10/1998 | Yamada et al. |
| 5,835,163 A | 11/1998 | Liou et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |
| 5,990,900 A | 11/1999 | Seago |
| 5,990,903 A | 11/1999 | Donovan |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,119,123 A | 9/2000 | Elenbaas et al. |
| 6,132,376 A | 10/2000 | Hossack et al. |
| 6,141,433 A | 10/2000 | Moed et al. |
| 6,166,744 A | 12/2000 | Jaszlics et al. |
| 6,173,328 B1 | 1/2001 | Sato |
| 6,184,937 B1 | 2/2001 | Williams et al. |
| 6,198,484 B1 | 3/2001 | Kameyama |
| 6,201,900 B1 | 3/2001 | Hossack et al. |
| 6,208,348 B1 | 3/2001 | Kaye |
| 6,211,941 B1 | 4/2001 | Erland |
| 6,215,516 B1 | 4/2001 | Ma et al. |
| 6,222,948 B1 | 4/2001 | Hossack et al. |

(56) References Cited

U.S. PATENT DOCUMENTS

| | | |
|---|---|---|
| 6,226,015 B1 | 5/2001 | Danneels et al. |
| 6,228,030 B1 | 5/2001 | Urbano et al. |
| 6,263,101 B1 | 7/2001 | Klein |
| 6,271,859 B1 | 8/2001 | Asente |
| 6,314,211 B1 | 11/2001 | Kim et al. |
| 6,337,709 B1 | 1/2002 | Yamaashi et al. |
| 6,360,027 B1 | 3/2002 | Hossack et al. |
| 6,364,835 B1 | 4/2002 | Hossack et al. |
| 6,373,970 B1 | 4/2002 | Dong et al. |
| 6,390,980 B1 | 5/2002 | Peterson et al. |
| 6,414,678 B1 | 7/2002 | Goddard et al. |
| 6,416,477 B1 | 7/2002 | Jago |
| 6,429,867 B1 | 8/2002 | Deering |
| 6,445,816 B1 | 9/2002 | Pettigrew |
| 6,456,340 B1 | 9/2002 | Margulis |
| 6,466,205 B2 | 10/2002 | Simpson et al. |
| 6,477,267 B1 | 11/2002 | Richards |
| 6,492,986 B1 | 12/2002 | Metaxas et al. |
| 6,496,598 B1 | 12/2002 | Harman |
| 6,509,926 B1 | 1/2003 | Mills et al. |
| 6,515,659 B1 | 2/2003 | Kaye et al. |
| 6,535,233 B1 | 3/2003 | Smith |
| 6,553,184 B1 | 4/2003 | Ando et al. |
| 6,590,573 B1 | 7/2003 | Geshwind |
| 6,606,166 B1 | 8/2003 | Knoll |
| 6,611,268 B1 | 8/2003 | Szeliski et al. |
| 6,650,339 B1 | 11/2003 | Silva et al. |
| 6,662,357 B1 | 12/2003 | Bowman-Amuah |
| 6,665,798 B1 | 12/2003 | McNally et al. |
| 6,677,944 B1 | 1/2004 | Yamamoto |
| 6,686,591 B2 | 2/2004 | Ito et al. |
| 6,686,926 B1 | 2/2004 | Kaye |
| 6,707,487 B1 | 3/2004 | Aman et al. |
| 6,727,938 B1 | 4/2004 | Randall |
| 6,737,957 B1 | 5/2004 | Petrovic et al. |
| 6,744,461 B1 | 6/2004 | Wada et al. |
| 6,765,568 B2 | 7/2004 | Swift et al. |
| 6,791,542 B2 | 9/2004 | Matusik et al. |
| 6,798,406 B1 | 9/2004 | Jones et al. |
| 6,813,602 B2 | 11/2004 | Thyssen |
| 6,847,737 B1 | 1/2005 | Kouri et al. |
| 6,850,252 B1 | 2/2005 | Hoffberg |
| 6,853,383 B2 | 2/2005 | Duquesnois |
| 6,859,523 B1 | 2/2005 | Jilk et al. |
| 6,919,892 B1 | 7/2005 | Cheiky et al. |
| 6,964,009 B2 | 11/2005 | Samaniego et al. |
| 6,965,379 B2 | 11/2005 | Lee et al. |
| 6,973,434 B2 | 12/2005 | Miller |
| 6,985,187 B2 | 1/2006 | Han et al. |
| 7,000,223 B1 | 2/2006 | Knutson et al. |
| 7,006,881 B1 | 2/2006 | Hoffberg et al. |
| 7,027,054 B1 | 4/2006 | Cheiky et al. |
| 7,032,177 B2 | 4/2006 | Novak et al. |
| 7,035,451 B2 | 4/2006 | Harman et al. |
| 7,079,075 B1 | 7/2006 | Hoffberg et al. |
| 7,098,910 B2 | 8/2006 | Petrovic et al. |
| 7,102,633 B2 | 9/2006 | Kaye et al. |
| 7,116,323 B2 | 10/2006 | Kaye et al. |
| 7,116,324 B2 | 10/2006 | Kaye et al. |
| 7,117,231 B2 | 10/2006 | Fischer et al. |
| 7,136,075 B1 | 11/2006 | Hamburg |
| 7,181,081 B2 | 2/2007 | Sandrew |
| 7,190,496 B2 | 3/2007 | Klug et al. |
| 7,254,264 B2 | 8/2007 | Naske |
| 7,254,265 B2 | 8/2007 | Naske et al. |
| 7,272,265 B2 | 9/2007 | Kouri et al. |
| 7,298,094 B2 | 11/2007 | Yui |
| 7,308,139 B2 | 12/2007 | Wentland et al. |
| 7,321,374 B2 * | 1/2008 | Naske ............ 345/647 |
| 7,327,360 B2 | 2/2008 | Petrovic et al. |
| 7,333,519 B2 | 2/2008 | Sullivan et al. |
| 7,333,670 B2 | 2/2008 | Sandrew |
| 7,343,082 B2 | 3/2008 | Cote et al. |
| 7,461,002 B2 | 12/2008 | Crockett et al. |
| 7,512,262 B2 | 3/2009 | Criminisi et al. |
| 7,519,990 B1 | 4/2009 | Xie |
| 7,532,225 B2 | 5/2009 | Fukushima et al. |
| 7,542,034 B2 | 6/2009 | Spooner et al. |
| 7,573,475 B2 | 8/2009 | Sullivan et al. |
| 7,573,489 B2 | 8/2009 | Davidson et al. |
| 7,576,332 B2 | 8/2009 | Britten |
| 7,577,312 B2 | 8/2009 | Sandrew |
| 7,610,155 B2 | 10/2009 | Timmis et al. |
| 7,624,337 B2 | 11/2009 | Sull et al. |
| 7,630,533 B2 | 12/2009 | Ruth et al. |
| 7,680,653 B2 | 3/2010 | Yeldener |
| 7,772,532 B2 | 8/2010 | Olsen et al. |
| 7,894,633 B1 | 2/2011 | Harman |
| 8,217,931 B2 | 7/2012 | Lowe et al. |
| 2001/0025267 A1 | 9/2001 | Janiszewski |
| 2001/0051913 A1 | 12/2001 | Vashistha et al. |
| 2002/0048395 A1 | 4/2002 | Harman et al. |
| 2002/0049778 A1 | 4/2002 | Bell |
| 2002/0063780 A1 | 5/2002 | Harman et al. |
| 2002/0075384 A1 | 6/2002 | Harman |
| 2003/0018608 A1 | 1/2003 | Rice |
| 2003/0046656 A1 | 3/2003 | Saxana |
| 2003/0069777 A1 | 4/2003 | Or-Bach |
| 2003/0093790 A1 | 5/2003 | Logan et al. |
| 2003/0097423 A1 | 5/2003 | Ozawa et al. |
| 2003/0154299 A1 | 8/2003 | Hamilton |
| 2003/0177024 A1 | 9/2003 | Tsuchida |
| 2004/0004616 A1 | 1/2004 | Konya et al. |
| 2004/0062439 A1 | 4/2004 | Cahill et al. |
| 2004/0189796 A1 | 9/2004 | Ho et al. |
| 2004/0258089 A1 | 12/2004 | Derechin et al. |
| 2005/0088515 A1 | 4/2005 | Geng |
| 2005/0104878 A1 | 5/2005 | Kaye et al. |
| 2005/0146521 A1 | 7/2005 | Kaye |
| 2005/0188297 A1 | 8/2005 | Knight et al. |
| 2005/0207623 A1 | 9/2005 | Liu et al. |
| 2005/0231501 A1 | 10/2005 | Nitawaki |
| 2005/0231505 A1 | 10/2005 | Kaye et al. |
| 2005/0280643 A1 | 12/2005 | Chen |
| 2006/0028543 A1 | 2/2006 | Sohn et al. |
| 2006/0061583 A1 | 3/2006 | Spooner et al. |
| 2006/0274905 A1 | 12/2006 | Lindahl et al. |
| 2007/0052807 A1 | 3/2007 | Zhou et al. |
| 2007/0260634 A1 | 11/2007 | Makela et al. |
| 2007/0279412 A1 | 12/2007 | Davidson et al. |
| 2007/0279415 A1 | 12/2007 | Sullivan et al. |
| 2007/0296721 A1 * | 12/2007 | Chang et al. ............ 345/427 |
| 2008/0044155 A1 | 2/2008 | Kuspa |
| 2008/0079851 A1 | 4/2008 | Stanger et al. |
| 2008/0147917 A1 | 6/2008 | Lees et al. |
| 2008/0162577 A1 | 7/2008 | Fukuda et al. |
| 2008/0181486 A1 | 7/2008 | Spooner et al. |
| 2008/0225040 A1 | 9/2008 | Simmons et al. |
| 2008/0225042 A1 | 9/2008 | Birtwistle et al. |
| 2008/0225045 A1 | 9/2008 | Birtwistle et al. |
| 2008/0225059 A1 | 9/2008 | Lowe et al. |
| 2008/0226123 A1 | 9/2008 | Birtwistle et al. |
| 2008/0226128 A1 | 9/2008 | Birtwistle et al. |
| 2008/0226160 A1 | 9/2008 | Birtwistle et al. |
| 2008/0226181 A1 | 9/2008 | Birtwistle et al. |
| 2008/0226194 A1 | 9/2008 | Birtwistle et al. |
| 2008/0228449 A1 | 9/2008 | Birtwistle et al. |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0033741 A1 | 2/2009 | Oh et al. |
| 2009/0116732 A1 * | 5/2009 | Zhou et al. ............ 382/154 |
| 2009/0256903 A1 | 10/2009 | Spooner et al. |
| 2011/0050864 A1 | 3/2011 | Bond |
| 2011/0074784 A1 | 3/2011 | Turner |
| 2011/0169827 A1 | 7/2011 | Spooner et al. |
| 2011/0169914 A1 | 7/2011 | Lowe et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0087570 A1 | 4/2012 | Seo et al. |
| 2012/0102435 A1 * | 4/2012 | Han et al. ............ 715/848 |
| 2012/0188334 A1 | 7/2012 | Fortin et al. |

(56) References Cited

U.S. PATENT DOCUMENTS

| | | |
|---|---|---|
| 2012/0274626 A1 | 11/2012 | Hsieh |
| 2012/0281906 A1 | 11/2012 | Appia |
| 2013/0051659 A1 | 2/2013 | Yamamoto |

FOREIGN PATENT DOCUMENTS

| | | |
|---|---|---|
| EP | 1187494 | 3/2002 |
| JP | 60-52190 | 3/1985 |
| JP | 2003046982 | 2/2003 |
| JP | 2004-207985 | 7/2004 |
| KR | 20130061289 | 11/2013 |
| SU | 1192168 A | 11/1982 |
| WO | WO 97/24000 | 7/1997 |
| WO | WO 99/12127 | 3/1999 |
| WO | WO 99/30280 | 6/1999 |
| WO | WO 00/79781 | 12/2000 |
| WO | WO 01/01348 | 1/2001 |
| WO | WO 02/13143 | 2/2002 |
| WO | WO 2006/078237 | 7/2006 |
| WO | 2012016600 | 9/2012 |
| WO | 2013084234 | 6/2013 |

OTHER PUBLICATIONS

Izquierdo et al., Virtual 3D-View Generation from Stereoscopic Video Data, IEEE, Jan. 1998, pp. 1219-1224.
Kaufman, D., "The Big Picture", Apr. 1998, http://www.xenotech.com Apr. 1998, pp. 1-4.
Hanrahan et al., "Direct WYSIWYG painting and texturing on 3D shapes", Computer Graphics, vol. 24, Issue 4, pp. 215-223. Aug. 1990.
Grossman, "Look Ma, No Glasses", Games, Apr. 1992, pp. 12-14.
Slinker et al., "The Generation and Animation of Random Dot and Random Line Autostereograms", Journal of Imaging Science and Technology, vol. 36, No. 3, pp. 260-267, May 1992.
A. Michael Noll, Stereographic Projections by Digital Computer, Computers and Automation, vol. 14, No. 5 (May 1965), pp. 32-34.
A. Michael Noll, Computer-Generated Three-Dimensional Movies, Computers and Automation, vol. 14, No. 11 (Nov. 1965), pp. 20-23.
Selsis et al., Automatic Tracking and 3D Localization of Moving Objects by Active Contour Models, Intelligent Vehicles 95 Symposium, Sep. 1995, pp. 96-100.
Smeulders et al., Tracking Nonparameterized Object Contours in Video, IEEE Transactions on Image Processing, vol. 11, No. 9, Sep. 2002, pp. 1081-1091.
International Search Report dated May 10, 2012, 8 pages.
Machine translation of JP Patent No. 2004-207985, dated Jul. 22, 2008, 34 pages.
International Search Report received fro PCT Application No. PCT/US2011/067024, dated Aug. 22, 2012, 10 pages.
Murray et al., Active Tracking, IEEE International Conference on Intelligent Robots and Systems, Sep. 1993, pp. 1021-1028.
Gao et al., Perceptual Motion Tracking from Image Sequences, IEEE, Jan. 2001, pp. 389-392.
Yasushi Mae, et al., "Object Tracking in Cluttered Background Based on Optical Flow and Edges," Proc. 13th Int. Conf. on Pattern Recognition, vol. 1, pp. 196-200, Apr. 1996.
Di Zhong, Shih-Fu Chang, "AMOS: An Active System for MPEG-4 Video Object Segmentation," ICIP (2) 8: 647-651, Apr. 1998.
Hua Zhong, et al., "Interactive Tracker—A Semi-automatic Video Object Tracking and Segmentation System," Microsoft Research China, http://research.microsoft.com (Aug. 26, 2003).
Eric N. Mortensen, William A. Barrett, "Interactive segmentation with Intelligent Scissors," Graphical Models and Image Processing, v.60 n. 5, p. 349-384, Sep. 2002.
Michael Gleicher, "Image Snapping," SIGGRAPH: 183-190, Jun. 1995.

Joseph Weber, et al., "Rigid Body Segmentation and Shape Description . . . ," IEEE Transactions on Pattern Analysis and Machine Intelligence, vol. 19, No. 2, Feb. 1997,pp. 139-143.
E. N. Mortensen and W. A. Barrett, "Intelligent Scissors for Image Composition," Computer Graphics (SIGGRAPH '95), pp. 191-198, Los Angeles, CA, Aug. 1995.
Office Action for EPO Patent Application No. 02 734 203.9 dated Sep. 12, 2006. (4 pages).
Office Action for AUS Patent Application No. 2002305387 dated Mar. 9, 2007. (2 pages).
Office Action for EPO Patent Application No. 02 734 203.9 dated Oct. 7, 2010. (5 pages).
First Examination Report for Indian Patent Application No. 01779/DELNP/2003 dated Mar. 2004. (4 pages).
International Search Report Dated Jun. 13, 2003. (3 pages).
Declaration of Barbara Frederiksen in Support of In-Three, Inc's Opposition to Plaintiffs Motion for Preliminary Injunction, Aug. 1, 2005, *IMAX Corporation et al v. In-Three, Inc.*, Case No. CV05 1795 FMC (Mcx). (25 pages).
USPTO, Board of Patent Appeals and Interferences, Decision on Appeal dated Jul. 30, 2010, Ex parte Three-Dimensional Media Group, Ltd., Appeal 2009-004087, U.S. Appl. No. 90/007,578, US Patent 4,925,294. (88 pages).
Office Action for Canadian Patent Application No. 2,446,150 dated Oct. 8, 2010. (6 pages).
Office Action for Canadian Patent Application No. 2,446,150 dated Jun. 13, 2011. (4 pages).
"Nintendo DSi Uses Camera Face Tracking to Create 3D Mirages", retrieved from www.Gizmodo.com on Mar. 18, 2013, 3 pages.
IPER, Mar. 29, 2007, PCT/US2005/014348, 5 pages.
IPER, Oct. 5, 2013, PCT/US2011/058182, 6 pages.
International Search Report, Jun. 13, 2003, PCT/US02/14192, 4 pages.
Partial Testimony, Expert: Samuel Zhou, Ph.D., 2005 WL 3940225 (C.D.Cal.), Jul. 21, 2005, 21 pages.
PCT ISR, Feb. 27, 2007, PCT/US2005/014348, 8 pages.
PCT ISR, Sep. 11, 2007, PCT/US07/62515, 9 pages.
CA Office Action, Dec. 28, 2011, Appl. No. 2,446,150, 4 pages.
PCT ISR, Nov. 14, 2007, PCT/US07/62515, 24 pages.
PCT IPRP, Jul. 4, 2013, PCT/US2011/067024, 5 pages.
European Office Action dated Jun. 26, 2013, received for EP Appl. No. 02734203.9 on Jul. 22, 2013, 5 pages.
Tam et al., "3D-TV Content Generation: 2D-To-3D Conversion", ICME 2006, p. 1868-1872.
Harman et al. "Rapid 2D to 3D Conversion", The Reporter, vol. 17, No. 1, Feb. 2002, 12 pages.
Legend Films, "System and Method for Conversion of Sequences of Two-Dimensional Medical Images to Three-Dimensional Images" Sep. 12, 2013, 7 pages.
Lenny Lipton, "Foundations of the Stereo-Scopic Cinema, a Study in Depth" With and Appendix on 3D Television, 325 pages, May 1978.
Interpolation (from Wikipedia encyclopedia, article pp. 1-6), retrieved from Internet URL:http://en.wikipedia.org/wiki/Interpolation on Jun. 5, 2008.
Optical Reader (from Wikipedia encyclopedia, article p. 1), retrieved from Internet URL:http://en.wikipedia.org/wiki/Optical_reader on Jun. 5, 2008.
U.S. Patent and Trademark Office, Before the Board of Patent Appeals and Interfaces, Ex Parte Three-Dimensional Media Group, Ltd., Appeal 2009-004087, U.S. Appl. No. 90/007,578, US Patent No. 4,925,294, Decision on Appeal, 88 pages, Jul. 30, 2010.
Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.htm).
Nell et al., "Stereographic Projections by Digital Computer", Computers and Automation for May 1965, pp. 32-34.
Nell, "Computer-Generated Three-Dimensional Movies" Computers and Automation for Nov. 1965, pp. 20-23.

\* cited by examiner

FIGURE 2B

Director-Style Parameters — 199

Principal Style
- First Person - Subject
- Third Person - Somewhat Objective
- Omniscient - Documentaries Objective Decomposition of a film (metadata and/or source frames)
- Scene (same environment and lighting)
- Shot (progressive sequence between shot intimacies and master shots)

Camera Angle
- Eye Level
- Bird's Eye View
- High Angle
- Low Angle
- Oblique Angle (surreal, action - indicates temporary change of style)

Camera motion
- Lock Down
- Crane
- Tracking
- Handheld
- Tripod Shot

Shot Intimacy
- Extreme Long Shot (high frequency data, atmospherics)
- Long Shot (live theater)
- Full Shot (whole body barely)
- Medium Shot (waste up)
- Close Up (face)
- Extreme Close Up (eyes or mouth)

Actor positions
- Full Front
- Quarter Turn
- Profile
- Three Quarter turn
- Back to camera Lighting
- Foreground
- Midground
- Background
- Ground Planes
- Sky Domes Priority of processing for progressive refinement
- inside lines of thirds
- faces
- items in motion
- items which are bright or colorful Settings for known processing components for each shot type from a particular director

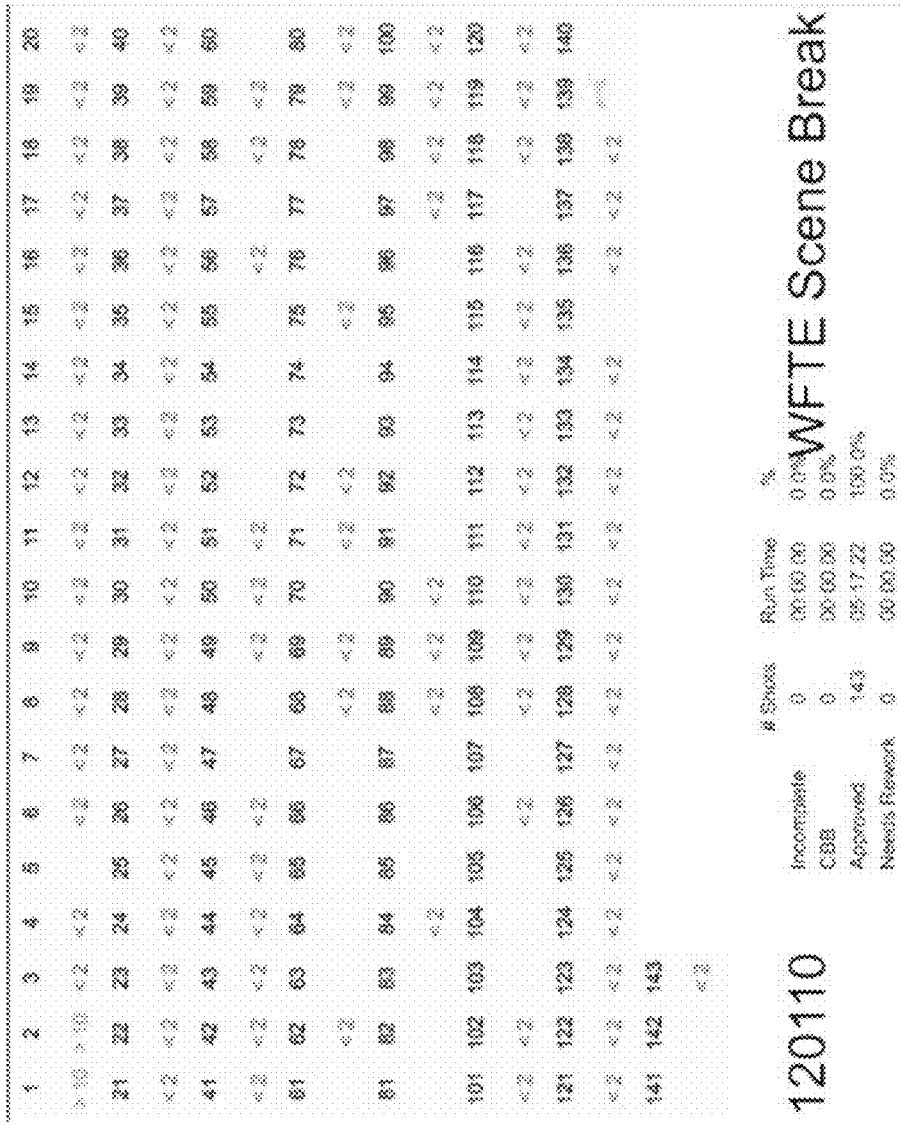

DIRECTOR-STYLE BASED 2D TO 3D MOVIE CONVERSION SYSTEM AND METHOD

BACKGROUND OF THE INVENTION

1. Field of the Invention

One or more embodiments of the invention are related to the field of image analysis and image enhancement and computer graphics processing of two-dimensional images into three-dimensional images. More particularly, but not by way of limitation, one or more embodiments of the invention enable an automated and semi-automated director-style based 2D to 3D movie conversion system and method that allows for rapid conversion of a sequence of two-dimensional images into three-dimensional images.

2. Description of the Related Art

Generally, movies are shot by a director using a style that is characteristic of that director, and which does not change much over time. For example, nearly all directors use a master shot, which gives context to the viewing audience, a medium shot, that focuses on the performers, close-ups and cutaways that respectively show the actors up close or items related to the actors, such as an item that an actor is using or referring to. A scene may then end with a master shot. This basic formula has not changed over a long period of movie making.

Cameras were eventually placed on trucks for side-to-side or simulated zoom, since movie cameras originally did not have zoom lenses. Later, vertically moving platforms were introduced to allow for up and down motion of a camera, followed by jibs that allowed the camera to remain pointed at an actor while being moved up and down. Directors generally utilize these techniques and equipment to film movies in the same director-specific manner over time. Directors generally do not change their specific style of shooting a movie. For example, some famous directors utilize only a few camera moves only in a particular movie.

The vast majority of movies ever filmed have been filmed with a single lens system as opposed to a stereoscopic camera with a pair of lenses. Recent movies shot in 3D or converted into 3D from a 2D movie have generally grossed approximately 40% more than the 2D version of a movie in a given theater complex. Hence, there is a large demand for the conversion of movies from 2D to 3D. Converting movies from 2D to 3D has traditionally been time consuming, expensive and limited in the amount of movies that can be converted. The advent of home-based 3D television sets adds to the demand for 3D content. Camera systems for shooting a movie in 3D are highly technical and have many problems including un-matched CCD chips, slightly rotated lenses, slightly different lens characteristics, etc., that make for viewing a stereoscopic pair of images from the two cameras difficult for the human brain. In addition, many of the 3D camera systems have limitations with respect to the effective depth that can be captured. For example, some 3D camera systems do not allow for capturing depth within about 6 feet. This requires directors to shoot certain shots in a completely different manner in which they would normally shoot a scene. The cost and weight of these types of cameras is very high as well. Most directors simply prefer to shoot their movies with standard single lens cameras and convert the film to 3D later.

Once a movie has been converted to 3D, there are many different technologies that are utilized to view 3D images. The different viewing technologies include shutter glasses that rapidly turn one lens on and off in alteration with the second lens of a set of glasses worn by a viewer. Another technology utilizes polarized lenses, where one lens of a pair of glasses is polarized vertically and the other lens is polarized horizontally. Yet another technology utilized Red and Blue lenses and an anaglyph image that has Red and Blue images for the right and left eyes superimposed. Regardless of the type of viewing technology, the viewer is able to perceive 3D images from a flat viewing surface.

Generally, directors shooting movies with a single lens camera have struggled over time to give a sense of depth to a two-dimensional movie. For example, some directors simply utilize a bluish or teal lighting scheme in the background and an orange or reddish lighting scheme in the foreground to give a sense of depth. Other directors may frame close up objects on the left or right side of the frame to give a sense of depth to the actors in the mid-ground or background of the image. In addition, a viewer may derive a sense of depth based on the motion of objects from frame to frame. For example, objects that appear to move fast in a scene may give a sense of near-depth as these are generally objects in the foreground. In addition, far away objects may be less saturated in color due to atmospheric interference, while objects that are near may be fully saturated with color. In addition, many directors frame using the "rule of thirds", so that visually important items, or objects of significance, such as actors, horizons and framing objects are shot at about one-third of the way from the top of the image and/or one-third of the way from the bottom of the image. In addition, another generally observed principle is that objects that are nearer are in the bottom one-third of the frame, while actors and mid-ground objects are in the middle-third, and background objects are in the upper-third of the frame.

Existing systems that are utilized to convert two-dimensional images or sequence of images that make up movies, to three-dimensional images are of one of two types. One type of conversion system is a manual conversion type. Regardless of the type of conversion, depths are assigned to human-perceived objects in a frame and these depths determine the amount of horizontal shift that is required to move objects in the frame left or right based on their assigned depth. By shifting portions of the image associated with a human-perceived object to the left, a right viewpoint image is created, by shifting portions of the image to the right, a left viewpoint image is created. Shifting objects can occur in each horizontal direction as well to effectively place objects nearer or further away from the distance implied by the captured image, i.e., the objects can be moved to or from a desired distance from an initial distance implied by the 2D image. Generally, the more shifting that occurs, the nearer the object. When the left viewpoint image is viewed by a viewer's left eye and a right viewpoint image is viewed by a viewer's right eye, stereoscopic vision occurs and the original 2D image appears as a 3D image with depth.

The manual conversion type process makes use of masks which historically have been laboriously created and manually reshaped from frame to frame to keep the mask situated on a desired area, with the correct shape and depth. This type of conversion produces very good results if diligence is observed in masking, however, the amount of labor required is extremely large. In addition, masking errors may be found late in the process and require rework by a set of workers that are geographically distant from the stereographers that utilize the masks, generally in a different time zone and/or country. This adds delays to the conversion process.

The second type of conversion system is an automated conversion type. The automated conversion type makes use of general characteristics of scenes in order to apply depth automatically in a crude fashion. For example, one type of automated conversion process applies a depth ramp to the bottom portion of a picture under the assumption that the bottom third of a picture is a floor in which mid-ground actors are standing. This type of conversion can occur in real-time, for example in a television that is programmed to show 3D images from a 2D video stream, however, the results are generally poor and may not be agreeably viewed based on what is actually in the scene. Another type of automated conversion process utilizes blue in the upper third of the image to set that part of the background to a deep distance, under the assumption that anything blue in the upper third of the image is sky. Another type of automated conversion applies closer depths to objects that are moving from frame to frame in a scene as being closer to objects that are further away. Many of these conversion techniques fail when utilized on images that do not conform to the assumed properties. For example, attempting to convert a scene of the ocean with a Blue/Red analysis does not work. Converting a panoramic scene with no floor by applying a ramp process to the bottom-third of the image also fails.

There are hundreds of types of automated processes for automatic conversion of 2D to 3D movies, but only certain types work for certain types of images. The main problem is that there is no known system that determines what processes to apply to which images, and specifically there is no known system that takes into account repeating patterns used by a particular director that can give clues as the best process or combination of processes to use to determine the depth of objects in the images that make up a movie. However, if the particular characteristics of a director were taken into account, the decision of which processes or combination of processes to use could be determined or at least narrowed down. Hence, it would be beneficial if there was a process for determining which conversion process or processes or combination thereof, to use for each frame, based on characteristics of lighting, lenses, color schemes or camera moves that a particular director uses time and time again. Hence there is a need for a director-style based 2D to 3D movie conversion system and method.

BRIEF SUMMARY OF THE INVENTION

Embodiments of the invention enable a director-style based 2D to 3D movie conversion system and method that allows for the automated or semi-automated conversion of 2D movies into 3D movies. Embodiments of the invention utilize director-style characteristics or statistics specific to the director to apply one or more 2D to 3D conversion process or combination thereof to a region of a frame or an entire frame, without requiring the creation, moving or reshaping of masks. By refining the processes or combination of processes utilized to convert a movie from 2D to 3D for a particular director, the system learns what works best for each director's style of movie shooting.

One or more embodiments of the invention can be utilized to ignore areas of an image that have been masked and add depth to areas of an image that have not been masked for example. This allows for a hybrid approach that enables specific elements of an image, for example computer-generated objects or user-defined masked areas to be ignored and/or depth enhanced independently. This approach enables areas that require highly refined depth precision to be separately processed. This approach also allows for automatically adding depth to areas that are difficult to mask, such as fog or haze for example. Embodiments of the invention thus enable an intelligent approach to the automated or semi-automated conversion of a movie from 2D to 3D.

Embodiments of the invention analyze one or more movies from a director to create a table of director-style characteristics or statistical information, which are also known generally as director-style parameters. One or more embodiments break a movie down into scenes and shots and identifying lighting, lens, camera moves and color schemes utilized by a director. The characteristics or statistical information is stored in a database accessible by a computer, or any number of computers over a network for example. Any method of storing the director-style parameters is in keeping with the spirit of the invention, so long as information related to a director's style is capable of being utilized to convert a movie from 2D to 3D.

Once a director's style has been analyzed, one or more embodiments of the invention utilize the director-style characteristics in one or more movies filmed by the director to determine the specific process or combination of processes to utilize to convert the movie from 2D to 3D. For a given scene with characteristic lighting as used by the director in other scenes and/or movies having teal colors in the background and orange colors in the foreground, the process for determining depth of the objects in the foreground, mid-ground and background based on these colors can be utilized to convert the frames of a scene. If the director utilizes fog or haze in scenes, then the process that determines depth by saturation values of the background and foreground can be utilized to automatically assign depth to portions of the frame. If the director uses these types of lighting and effects in other frames, then statistically, the two processes can be combined in a director specific amount to assign depths to regions of the frame without manually generating, moving or reshaping masks. Since the determination of which processes to utilize can be based on the success of a previous conversion of a similar shot, great effort can be saved. In addition, some movies have so many objects or move so fast or use so many effects that they cannot be realistically be masked and converted manually. Hence, for some projects, embodiments of the system are the only cost effective technique for conversion from 2D to 3D.

Since directors are creatures of habit, and utilize the same type of camera shots and same types of lighting over and over, embodiments of the invention allow for a great reduction in labor by analyzing a shot and determining which particular director-specific technique is being utilized. After determining the particular director-specific technique that is being utilized, the specific process or combination of processes that have been utilized in the past, even for a different movie by the same director, or optionally for a different director with the same type of shooting style, can be applied to the conversion of the shot from 2D to 3D without requiring a stereographer to start from scratch.

Embodiments of the invention are implemented with one or more computers. The computer(s) contain computer software specifically programmed to determine which processes or combination of processes to apply in the 2D to 3D conversion process, based on director-style characteristics. Embodiments may utilize a library of processes that convert any specific type of 2D image to a 3D image. For example, some directors utilized 2 kicker lights and 1 key light consistently. Other directors may utilize 1 key light and 1 fill light. Based on the type of lighting utilized, different processes or combinations of processes may be employed to automatically assign depths to various lighted elements in the frame. For example, some directors utilize lights such as a light that is 30 degrees off to the right of a stage that points down and which is bright, another light that is 30 degrees up to the left that is dimmer, and a rim light pointing towards the camera (and which defines the mid-ground objects via silhouettes easily). Using a particular process that looks for silhouettes in the mid-ground allows for very good automatic assignment of depths to objects in this region. Thus, knowing that the director utilizes these types of lights repeatedly when filming a movie allows for automated assignment of depths to these objects.

If the director also is known for applying the rule of thirds to the scene, then one or more process can be utilized at around one-third of distance from the bottom of each frame, or in the bottom-third of the screen in order to intelligently apply depths automatically to that region of the frame. If the director is known for shooting scenes with a foreground floor, then for example a ramp function of depth can be applied in that area, if that shot has a foreground floor after analyzing the shot. The bottom third of each image provides an area where processing can be flexibly applied since in many instances, objects are found in that region that the viewer's eyes do not snap to, but rather gravitate towards.

In addition, skin identification software can be utilized to find faces of actors and automatically bulge depth for the face in the center and add appropriate depths for the eyes and teeth so that the do not appear sunken in the face. Any level of sophistication can be utilized for face recognition processes including processes that identify the center of the mouth, nose point and/or eye point, so that depth can be automatically applied, translated, rotated and warped to match the orientation of an actor's head for example.

After the automatic conversion process is complete for a movie, the movie is viewed using 3D glasses for example, and if there are any quality assurance issues, those portions of the frames can have different processes or varying degrees of a combination of processes applied to those specific areas. One embodiment of the invention has been utilized to convert a movie from 2D to 3D with 200 shots, wherein only 7 of the shots were re-converted to utilize one or more different depths. By training the system as to which scenes need to be re-converted or converted in a more viewer acceptable manner, the system improves its modeling of the style of the director over time. This training process yields a huge savings in labor.

Television programs generally utilize very simple lighting that is consistent through a show based on a director's style and for example lighting setup. Frames from television shows may thus be automatically depth assigned in a consistent manner based on the characteristics associated with a director.

Embodiments of the invention generally utilize one or more processes that automatically determine which area of a frame to operate on. Based on the region or segment of the frame that a process is assigned to, the process analyzes the area, based on a director's typical movie making characteristics and automatically assigns depth to a portion of the region. Embodiments of the invention then gap fill any necessary areas where underlying image data is not available (for example from a different frame) when shifting nearer objects more horizontally to create a left and right viewpoint of an image.

In one or more embodiments of the invention, each image is converted into the frequency domain, generally through use of a fast Fourier Transform (FFT). Regions of the image to apply various processes to are determined in the frequency domain. Since the frequency domain is utilized for determining regions, an inverse FFT is utilized to get the image data back into the spatial domain, wherein cross-dissolves are automatically built into the frequency domain. As such, there are no gaps since filters are utilized. In addition, one or more embodiments of the invention allow for varying degrees of the different processes to utilize in a region. This may be implemented for example via a graphical user interface element such as "sliders" or other controls that allow for a varying amount of each process to be utilized in the automated depth conversion process.

Processes that are applied in a region based on director-style characteristics may be ordered to occur before or after other processes, since one process may yield different results if the process were to execute in a different order. For example, some directors do not properly white-balance a movie or shot/scene in a movie. Thus, by properly white balancing a scene first, a process that determines depth by looking for teal or blue tones in the upper-third of a frame can execute correctly. In addition, since orange or red tones may be utilized for foreground objects by some directors, normalizing the white balance first allows for this type of automated depth processing to work properly. For regions that are difficult to convert, processes may be applied specifically to that region without masking objects in the region, so that the desired results are achieved. Processes may be globally applied to a shot as well. Furthermore, as a scene or shot in a scene changes, the percentages of the different processes to utilize may vary in time. Embodiments of the invention store the timing history for settings of the selected processes, so that the percentage of each process utilized in a scene varies. An example of a scene that may utilize a different set of processes or different values for each of the processes employed over time includes a scene that starts indoors and moves outdoors. Embodiments of the invention can automatically identify when the transition occurs and automatically perform a cross-fade of the processes through the scene. In other words, the processes that are utilized on a given shot can be "tweened" throughout the scene so that different techniques or processes are utilized as the characteristics of the shot change.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 23 shows the workflow interface that shows which shots have been completed or need rework, etc.

DETAILED DESCRIPTION OF THE INVENTION

A director-style based 2D to 3D movie conversion system and method will now be described. In the following exemplary description numerous specific details are set forth to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
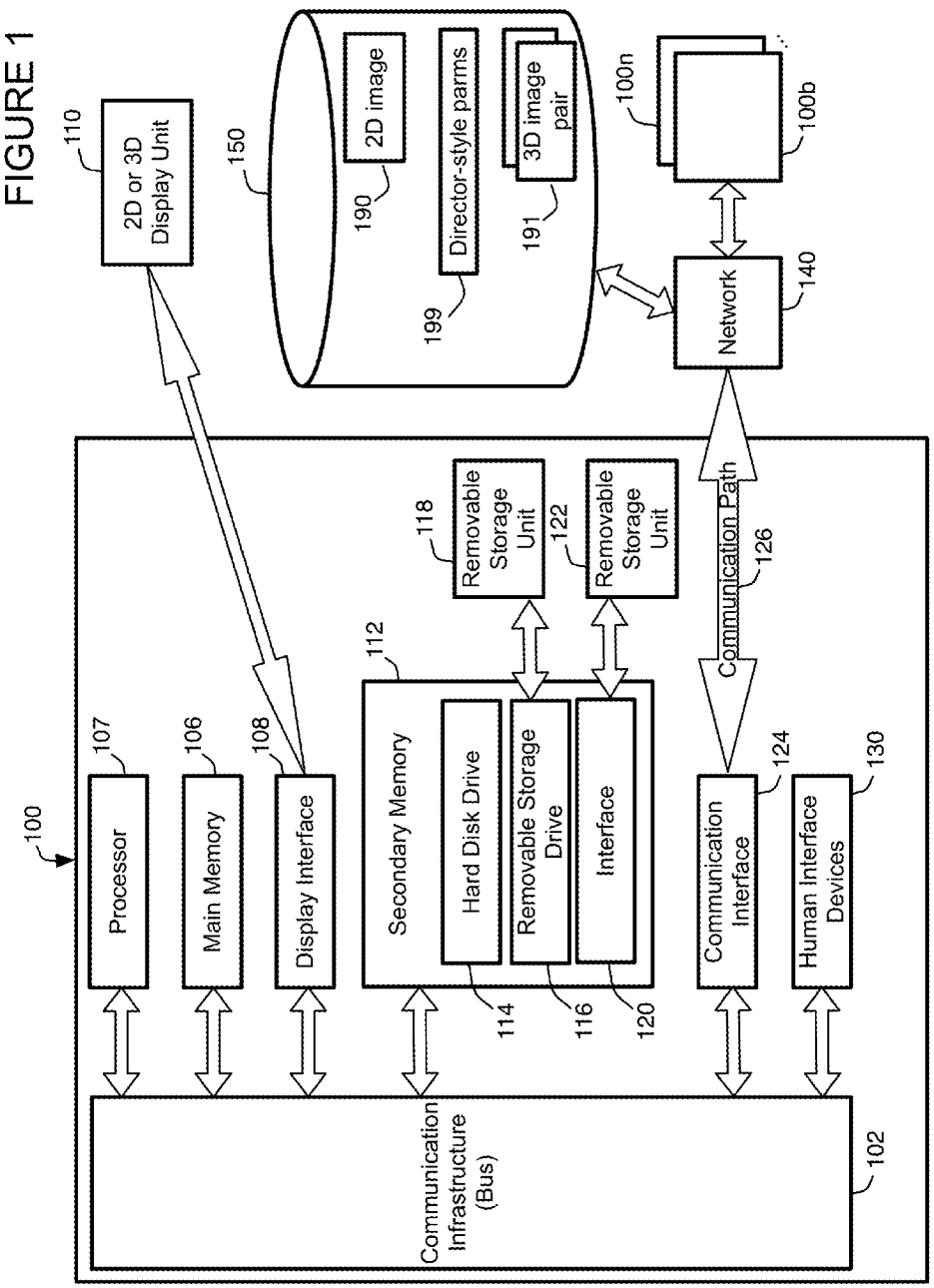
FIG. 1 shows a hardware architecture diagram of one or more embodiments of the invention.

FIG. 1 shows a hardware architecture diagram of one or more embodiments of the invention. Embodiments of the invention may be implemented with general-purpose computer 100, along with other computers 100b-100n that may be configured to implement the software architecture and process flow shown in FIGS. 2A, 2B and 3 respectively. Also shown in FIG. 1 are peripherals which, when programmed as described herein, may operate as a programmed computer or programmed computer system capable of implementing one or more methods directed to the embodiments described throughout this disclosure. Processor 107 may couple with a bi-directional communication infrastructure such as communication infrastructure 102. Communication infrastructure 102 may be implemented as a system bus that provides an interface to the other components in the general-purpose computer system such as main memory 106, display interface 108, secondary memory 112, communication interface 124 and human interface devices 130, such as a keyboard and/or mouse for example. The invention may also operate on a set of networked computers 100b-110n, performing various steps herein in parallel. Since movies may contain over 100,000 images to be converted, a large number of computing elements greatly speeds the conversion process. Alternatively, a computer system with a large number of internal processors may also be utilized. Any other architecture capable of determining at least one process to utilize in the conversion of a particular director's movie based on that director's specific style of shooting movies may be utilized.

Main memory 106 may provide a computer readable medium for accessing and executing stored data and applications specific to determining a director-style characteristic for a shot. Director-style characteristics for example may be stored in director-style parameters 199 in database 150. These characteristics and corresponding processing component settings are utilized to determine the combination of methods used to convert a movie from 2D to 3D. Main memory 106 may be implemented to store 2D image 190 for example as obtained from database 150, wherein main memory 106 may also be utilized to hold converted 3D image pair 191 (or single 3D anaglyph image). The converted image(s) 191 may then be stored in database 150 for example, or locally in secondary memory 112, such as in hard disk drive 114 for example. Any other combination of storage elements may be utilized to obtain and store images 190, 191. Display interface 108 may communicate with display unit 110 that may be a 2D or 3D display and that may be utilized to display outputs to the user of the programmed computer system, such as a stereographer responsible for converting the movie, or to a viewer wearing 3D glasses for example. Display unit 110 may comprise one or more monitors that may visually depict aspects of the computer program to the user. Main memory 106 and display interface 108 may be coupled to communication infrastructure 102, which may serve as the interface point to secondary memory 112 and communication interface 124. Secondary memory 112 may provide additional memory resources beyond main memory 106, and may generally function as a storage location for computer programs to be executed by processor 107 as well. Either fixed or removable computer-readable media may serve as secondary memory 112. Secondary memory 112 may comprise, for example, hard disk 114 and removable storage drive 116 that may have an associated removable storage unit 118 and/or 122. Since each frame or 2D image 190 may require 200 megabytes of data storage, a large array of disks, for example a RAID 5 self-healing array of several terabytes may be employed for example. There may be multiple sources of secondary memory 112 and systems described in this disclosure may be configured as needed to support the data storage requirements of the user and the methods described herein. Secondary memory 112 may also comprise interface 120 that serves as an interface point to additional storage such as removable storage unit 122. Numerous types of data storage devices may serve as repositories for data utilized by the programmed computer system detailed in FIG. 1. For example, magnetic, optical or magnetic-optical storage systems, or any other available mass storage technology that provides a repository for digital information may be used.

Communication interface 124 may be coupled to communication infrastructure 102 and may serve as a conduit for data destined for or received from communication path 126. A Network Interface Card (NIC) is an example of the type of device that once coupled to communication infrastructure 102 may provide a mechanism for transporting data to and from communication path 126. Network 140 may be implemented with any type of Local Area Network (LAN), Wide Area Network (WAN), wireless network, optical network, distributed network, telecommunications network or any combination thereof. Since the amount of data transferred is so large, the faster the network, generally the faster the conversion process.

To facilitate user interaction with the programmed computer system, one or more Human Interface Devices (HID) 130 may be provided. Some examples of HID's that enable users to input commands or data to the specially programmed computer may comprise a keyboard, mouse, drawing pad, touch screen devices, microphones or other audio interface devices, motion sensors or the like, as well as any other device able to accept any kind of human input and in turn communicate that input to processor 107 to trigger one or more responses from the specially programmed computer are within the scope of the systems and methods described throughout the disclosure.

Computers 100b-100n may act as a "swarm" to convert portions of a movie, so as to speed the process of conversion from 2D to 3D. Any number of computers may be utilized to convert a movie from 2D to 3D. Generally movies have more than 100,000 frames, so a large number of computers can greatly reduce the time required to convert a movie. The computers may be programmed to operate in batch mode at night as well, or on computers within a network that are not being fully utilized for example.

FIG. 2A shows a software architecture diagram for software modules configured to execute on the hardware architecture of FIG. 1. Software modules 200, 200b-200n, 210 and 211, execute on computer 100 and/or 100b-100n (see FIG. 1) to convert 2D image 190 to 3D images 191 (or single anaglyph left/right image depending on the desired output format). The system utilizes graphical user interface "GUI" 250 to obtain director-style settings for processing components 200b-200n and to display 2D image 190 and/or 3D images 191. Each processing component may have an associated GUI component (403 in FIG. 4) on GUI 250 as shown by lines between GUI 250 and processing components 200b-200n. The software modules include any positive integer number of processing components 200, 200b-200n, each of which is also called a "conversion widget". Processing component 200 may include executable processor instructions specific to processor 107 or any other interpretable instructions such as macros, scripts or any other type of instructions specifically implemented to enable a particular type of 2D to 3D conversion. Each processing component 200 may be implemented with a common input interface 201 and may provide processing instructions 202 specific to a type of 2D to 3D conversion, along with common output interface 203. By utilizing a common input and output interface, processing components 200b-200n may be utilized in an object oriented "strategy pattern" for example to operate interchangeably on images 190 to create images 191. An example input interface may include a reference to an image to process, an area to work within and director specific settings for example. An example output interface may include a reference to an output image pair (or anaglyph image for example). Any other input and output interface that allows for the conversion of 2D to 3D images is in keeping with the spirit of the invention.

Many different types of processing components 200b-200n may be loaded into or otherwise utilized by executable 210. For example one type of processing component may be specifically configured to set depth for blue oriented pixels to a deeper depth than red oriented pixels. Another type of processing component may be specifically configured to set areas with low saturation to a deeper depth than highly saturated areas. Another type of processing component may be utilized to look for outlines in the middle-third of the 2D image 190 and set depths of the areas with outlines from backlighting to a mid-range depth. The processing components may be utilized in combination, so that mid-ground object areas as determined by the backlighting processing component, that are brighter, as determined by a brightness processing element, may be set to a depth that is nearer to the viewer for example.

Over time, director-style manager 211 obtains settings for each of the processing components 200b-200n from a stereographer responsible for the conversion via executable 210 and saves the director-style settings for the processing components within the system, for example in director-style parameters 199 in database 150 for example. These settings are shown in the bottom line of the data structure of FIG. 2B, and can take the form of a list, array, set, or any other known data structure that can associate a group of director-style parameters associated with a scene and/or shot(s) and the settings for processing components 200b-200n that can successfully be utilized to convert the desired image frames from 2D to 3D. The nearer a given shot is to an existing set of director-style parameters, i.e., principal style, scene/shot length, camera angle, camera motion, shot intimacy, actor positions, lighting, priority of processing, then the more likely a known setting or settings for one or more processing components is likely to acceptably convert one or more images from 2D to 3D. By checking for existing shots that are similar in director-style parameters 199, for example by correlation techniques or any other method of determining how close one set of characteristics are to another, processing component settings can be utilized instead of requiring a stereographer to create the settings manually.

FIG. 2B shows a detailed embodiment of the director-style parameters data structure shown in simple block form in the hardware architecture of FIG. 1. The director-style parameters can be determined programmatically, or by accepting input by the system from a user or any combination thereof for example. Regardless of the manner in which the director-style parameters are obtained, the system compares these characteristics with previously analyzed scenes/shots from a director and determines which shots for example are closest to the current shot. The processing component settings that were previously used to acceptably convert the shot from 2D to 3D can then be applied to the processing components 200b-200n in the graphical user interface and automated conversion may then be performed by the system.

As shown in FIG. 2B, the director-style parameters include the principle style that a director shoots in along with metadata and/or source frames for each scene and shot in a movie that is to be converted from 2D to 3D. In addition, each shot in each scene includes a camera angle, camera motion, shot intimacy, actor positions and lighting for example. In one or more embodiments the operator is queried for a "principle style" that the director shoots in. The principal style can be first person, i.e., where the camera is in first person view. A more common principal style is that of third person. The difference between first person and third person can be somewhat subjective, but in either case, the camera may still have a good deal of motion. In first person, it is expected that there will be a lot of camera shake, a lot of handheld work or stabilized camera work. In third person, it is expected to observe only those kinds of camera motions when there is some particular action that is occurring or some dramatic effect. The rest of the time in third person there is usually a smooth camera or a locked down camera. The third type of principal style a director can have is omniscient. This is a fully objective style. This style is typically utilized in shooting documentaries with a voiceover. The camera itself is not utilized to convey drama, and is not utilized to tell part of the story, the camera is in fact just ever present. Whereas third person is more like a "fly on the wall" and first person is as if the viewer is the victim or the principal involved. Again, any manner of determining the difference between these principal styles, including motion analysis images from frame to frame for example is in keeping with the spirit of the invention.

To some degree all films will have a variety of these principal styles, but each director has a tendency to shoot in a particular principal style. Once the principal style is determined, either programmatically or by obtaining input from a subjective viewer, that knowledge can be utilized to help decompose the film.

The film is basically broken into scenes and shots. A scene uses the same environments and lighting so the computer can identify a scene break primarily by a global change in lighting conditions. This allows the system to accurately break down scenes in an automated fashion. In order to break the scenes down though, one or more embodiments of the invention samples the edges of the frame and makes sure that the camera is not in motion. If the camera is in motion and the system observes the same relative speed along the edges of the frame, then the system has to be careful because there could be dramatic changes in lighting due to running through the woods for example. The system also has to be careful to detect a tracking shot where the camera is travelling from indoors to outdoors even though the lighting changes are actually in the same scene and probably the same shot. In one or more embodiments of the invention, the user can be queried to determine if lighting changes are indicative of a scene change or shot change for example. Any other method for determining scene and shot changes may be utilized in one or more embodiments of the invention, including programmatically observing lighting changes or image changes through any known image analysis technique or in any other manner for example.

After the system has broken down the scenes, i.e., similar environments for example based on lighting changes, then the system breaks each scene into shots. Shots are the atomic element of film production and shot length typically ranges 3 to 5 seconds. Very fast cuts may go down to a second or a half a second and usually these are action sequences or music videos. On the other extreme an entire film may use a single shot or very few shots. In those cases, the film is typically associated with a "ride film", a video of a roller coaster ride. In a ride film the principal style is first person and the shot is of a continuous ride. One or more embodiments of the system store not only the images of each scene/shot to be converted, but also metadata associated with each scene/shot, i.e., how long each scene/shot is for differentiating types of scenes and shots with a current scene/shot to be converted.

Once the system has broken the movie or film down into scenes and into shots, the next characteristic to determine is to identify camera angle for each shot. Camera angles typically fall into 5 categories.

Camera angles can be at eye level (which can be identified through facial recognition) and the system can generally assume that most films are shot at eye level for most of the time. This is not always true, but is generally true particularly with most directors today.

Another camera angle is known as the bird's-eye view. A bird's-eye view is looking straight down upon the subject. There's no sky at all in the shot. There are generally only two classes of shots when a shot is filmed outside, a bird's-eye view and a "high angle". A "high angle" camera angle is looking down but not quite directly overhead, for example at a 45 degree angle. Again facial recognition may be utilized by the system on these shots. Typically the system will not detect any faces in a bird's-eye view. The system will get only partial recognition of faces at high angle views. The system also detects that, unlike eye level shots, or other shots that show both the ground and the sky or both the floor and the ceiling that there is not a gentle progression of lighting upward. In one or more embodiments, the system may sample an image at an extremely low resolution and perform a low pass filter. This shows blobs representing the people and the trees and the furniture, etc. but there is typically less chance of a gradual progression as when the system observes changes in an image from green to blue for example, looking at an eye level shot or a typical shot of the ground and the sky.

Another camera angle is a "low angle" shot, where the camera is down low and pointing upward. Again, the system utilizes facial recognition software to help identify this. Also if a camera is outdoors then there tends to be a lot more sky involved than there is of the ground plane. If the camera is indoors the system tends to observe all of the lighting more, meaning a lot more high frequency pointillistic light, whereas with high angles the system does not identify these types of lights as frequently.

The last camera angle type is an "oblique angle". An oblique angle is where the camera is actually tilted somewhat. This is also known as the "Dutch angle". The oblique angle is important because it indicates a temporary change of style is coming. The oblique angle is primarily used for surreal or action shots. For example, in a scene where there is a fight going on and somebody draws a gun and all of a sudden the scene shot at a tilt. Everything is off angle. The ground seems to be tilting away from the viewer. The system is programmed to then look for a sequence of either slow motion or fast cuts and that this is going to be a temporary change. The main point is that the principal lines in the shot are all at angle—typically in the 30 to 45 degree range. The system identifies this by sampling a single frame and then sampling a series of single frames to statistically gather data from a facial database and from sky color and calculating the key lines in the shot in order to determine if the shot uses an oblique angle.

Embodiments of the invention thus programmatically determine which of the five camera angles a shot is captured with through image analysis as one skilled in the art will appreciate. In addition, one or more embodiments of the system are configured to obtain input from a user to determine or override a camera angle for a shot as calculated by the system.

Once the system has calculated which of the five shots has been utilized, then the computer determines what type of camera motion has been utilized. There are 5 basic camera motions detected by the system.

One camera motion type is the "locked down" type. This camera motion is utilized for a shot wherein the shot itself is stable and steady and the camera is not in motion. This is typically the camera motion type utilized for documentaries. This type of camera motion is also utilized when there is a lot of action in front of the camera. One way to identify the locked down type is to look at the edges of the frame in a shot and if system determines that there is low variation going on from frame to frame or virtually none, then the system can assume that the camera is locked down. Locked down shots simplify conversion from 2D to 3D, but prevent the system from taking advantage of temporal coherency where, when the camera is in motion, if there is a gap of missing background information in the process of stereosynthesis, the system can sample images forward and backward in time in order to find missing image data from a previous or subsequent image frame. This enables the system to use valid background image data to use in the current frame when shifting left or right to make the final image pair (or anaglyph). With a locked down shot the system may or may not have this advantage for foreground items that are not moving from frame to frame for example. If there is missing background information that is required for filling a gap when translating a portion of an image horizontally, the system may utilize any type of gap fill. Gap fill is utilized for example to programmatically generate image data if there are no frames that display missing background information when the missing background information is needed to fill a gap for stereosynthesis. Any known type of gap fill may be utilized in one or more embodiments of the invention.

The second kind of camera motion is the crane type. This camera motion is typically utilized for a shot that has a lift or descent, or some sort of motion in the principal vector along the screen edges, i.e., which is vertical. An alternative to a crane shot could be a left and right shot as well, which is also known as a dolly shot (but could be done on a crane). The system is configured to look at the edges of the image frames and determine what the principal motion vector is during the shot, i.e., left/right, up/down, or diagonally. By determining the camera motion type, it is easier for the system to track objects that are already identified so that the system does not have to identify the particular objects frame by frame.

The third type of camera motion is the tracking type. A tracking camera motion is utilized for a shot using a motion-stabilized camera, or it may be taken on a dolly or crane. This type of camera motion is utilized where the action is to be followed. The principal characteristic of this from an image-processing standpoint is that the center of the screen is relatively static while the edges of the screen are in fairly dramatic motion. And this is because frequently the motion-stabilized camera operator is walking backwards following a speaking actor looking into the camera so there are a lot of dynamics along the edges of the frame but the center of the frame is basically a locked down shot.

The fourth type of camera motion is the handheld type. Handheld camera motion is utilized for shots very much like with a crane shot, i.e., is at angle—horizontal, vertical or diagonal. However, the system is programmed to determine over time to determine the direction that the camera is pointing in, which varies greatly with a handheld type of camera motion in general. The direction vector is also not stable so there is a lot of bouncing and motion and a little bit of rotation typically going on in a handheld shot.

The fifth type of camera motion is a tripod type. Tripod camera motion is typically used for pans and tilts. Tripod type camera motion can be considered a subset of a crane motion type. The primary difference is that the camera is not in motion in this case. The system determines that that the camera is rotating about the center of gravity during the shot. That allows the system to make optimizations because in a crane shot the system does not know where the center of rotation is—the local origin of rotation—but in a tripod shot the system determines that the center of rotation is in fact the location of the camera and that allows the system to understand that there are certain rules and restrictions that are applied to how much something can move when the system is tracking objects in the images.

The next element of director-style parameters 199 is shot intimacy. So for each shot, the system determines the shot intimacy such as an extremely long shot which is typified by high frequency data and atmospherics. The system determines if the shot is a "long shot", i.e., for a live theater shot, and if so facial identification is usually fruitless because the shot is a master shot. These extreme long shots typically occur right after a dramatic change of lighting because master shots are frequently end caps on a scene. The director starts with the master shot, the extreme long shot, which then builds into that scene. A director may also start with a long shot instead of an extreme long shot—this is roughly equivalent to a live theater shot in size. From there the scene typically goes into a combination of full, medium, close-up and extreme close-up shots depending upon the action that is occurring. The primary method the system utilizes in identifying these is a combination of the data frequencies that are calculated globally in each shot. Particularly as compared to the data frequency in the center of the shot which is where the system would expect the principal actors to be and also through facial recognition.

The next element of director-style parameters 199 is actor positions. Once the system has identified the actors and has determined the places where faces occur, the system determines the actor positions. The goal is to understand whether or not the system has a full front, a quarter turn, a profile, a three quarter turn or a back to camera shot. Here the system is configured to appropriately apply a humanoid and face depth maps to the actors automatically by automatic identification of their positions. Any type of face recognition software may be utilized with embodiments of the invention.

The system then determines the type of lighting, i.e., foreground, mid-ground and background lighting. Many films today are sort of orange in the foreground and teal in the background. Atmospherics also add to that but there are two other types of lighting—ground planes and "skydomes".

A ground plane lighting is typically fairly modeled but ground planes are classically brought up to the horizon line. They are classically brought up to either the first line of thirds or the bottom line of thirds or the top line of thirds and the system tries to identify significant changes in lighting between that bottom third and the center, or the center and the top third, to identify where that ground plane is. That's significant because when doing 3D conversion of objects, the system may positions objects that are on the ground plane so as to be in fact locked on the ground plane. That is, for an actor who is standing on the ground, at the point of intersection between the feet and the ground may be set to be at the same distance. Thus, embodiments of the system may identify the ground plane to make sure that actors/objects do not appear to be floating in space or at a distance that differs from where they are actually located on the ground on which they are standing.

The last type of lighting is skydomes. The system utilizes any type of sky identification software that takes into consideration clouds and modeling and the gradations of sky. In that case the system applies a dome effect of geometry so that the appropriate perspective is utilized and then clouds are brought forward.

The system is configured to calculate all of these parameters so that human operators do not have to take the time to do so. The depths to use on object can be iteratively applied for progressive refinement.

One of the largest problems in 2D to 3D conversion is that the work is principally done as a work to price and a work to schedule. Unlike a number of other large human endeavors where it does not matter what a project costs and it does not matter how long a project takes, in the case of 2D to 3D conversion projects, there is typically a requirement to release on a certain date and with a certain price. In that case there are tradeoffs that the system can control. The way that the system does this is through the process of progressive refinement. And that is where the priority of processing based upon director-style characteristics is important. For example, inside all of the lines of thirds, i.e., that is the principal center of the screen, the system may be instructed to spend more processing time in that area than on the edges because the edges are frequently "throwaway". The edges are throwaway because of different aspect ratios and because the edges are not typically where the viewer's attention is directed.

Faces are of higher importance. Thus, the system may be implemented to spend more time and more detail in the construction of depth (or Z data) for faces than for almost anything else. A vase sitting on a table has depth accuracy that is significantly less important than the depth accuracy of faces in a frame in part because the human eye is so adapted to identifying problems of human faces. Thus, prioritizing portions of each image to convert may save great amounts of labor and make a project profitable, while still maintaining the acceptable level of 3D depth for objects in a scene.

The system may also be implemented to spend more attention on items in motion. Items in motion are usually the subject matter that a viewer is interested in. The system can be implemented to remove the pan, or crane or whatever camera motion there is and after the removal of camera motion, identify items that are static in motion by looking at the edges of the frame. Those items that are static in motion are typically principal actors, principal issues and a locked down camera. The things that are in motion are just the opposite. Those are typically the things that viewers are most interested in. A good example would be a locked down shot on the beach and a director is filming a surfer. The surfer in motion is where the system may be configured to spend the majority of the processing power.

The system may also be implemented to spend additional processing power on things that are bright, i.e., have a high luminosity or are colorful because directors typically use bright and colorful objects as a method of directing our attention. The system can be implemented to offset the sky, particularly for scenes that have heavy backlighting, but certainly in an indoor environment where very frequently the key subjects are often the best lit objects.

Analyzing a shot from a particular director and applying processing component settings that were previously utilized to successfully convert a similar shot from that director saves a large amount of effort and time.

Figure 2:
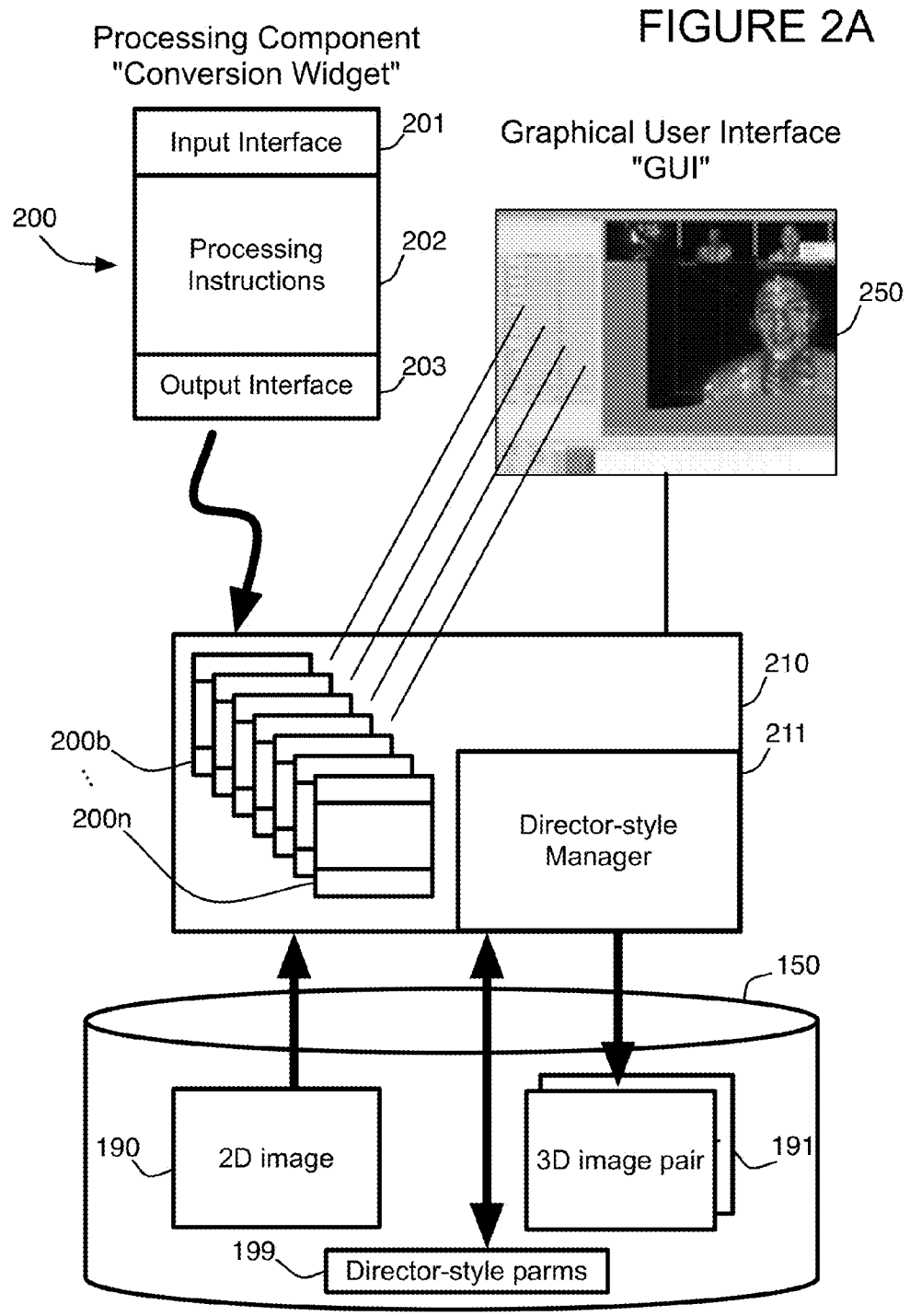
FIG. 2A shows a software architecture diagram for software modules configured to execute on the hardware architecture of FIG. 1.
FIG. 2B shows a detailed embodiment of the director-style parameters data structure shown in block form in the hardware architecture of FIG. 1.
Figure 3:
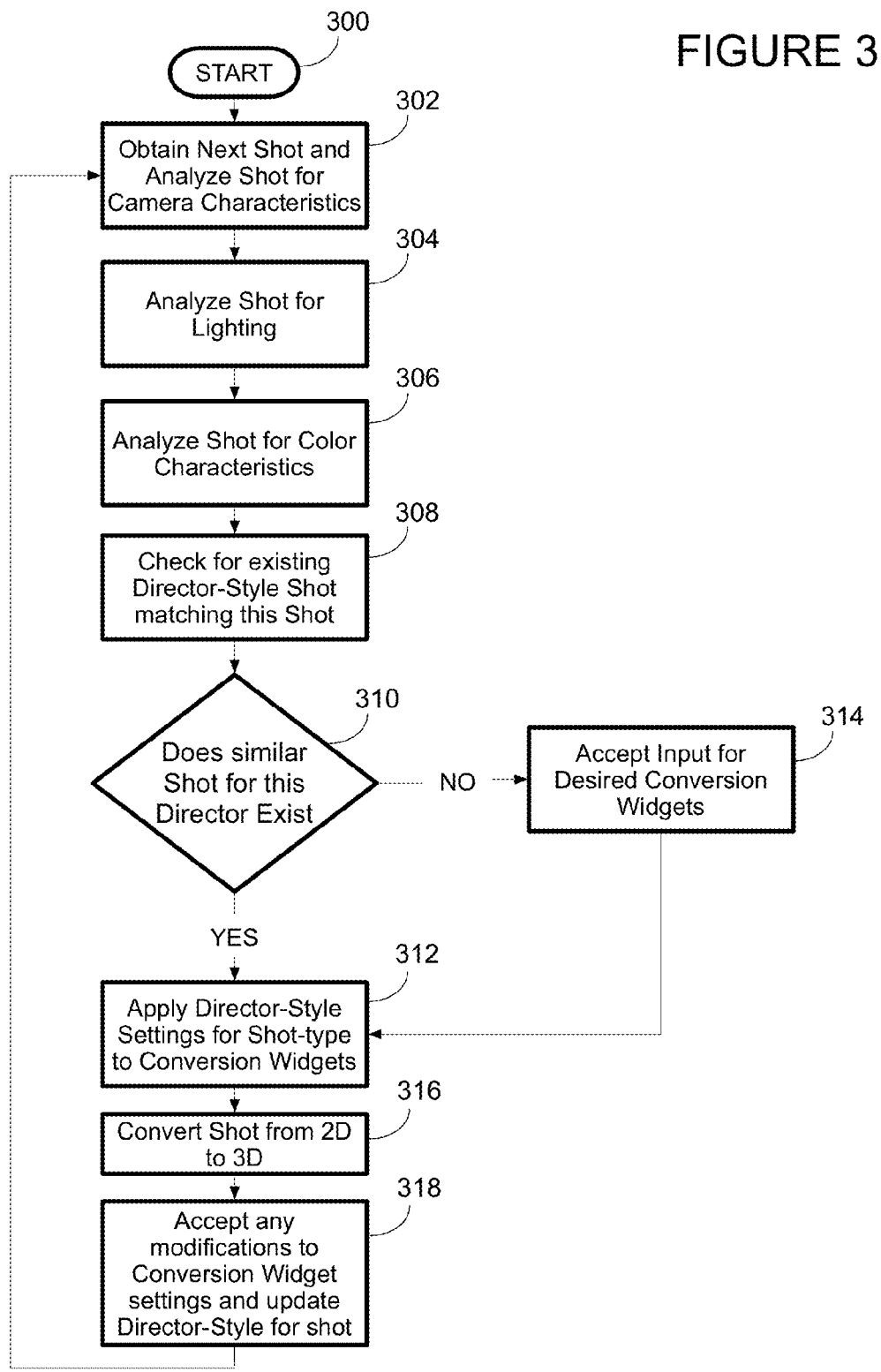
FIG. 3 shows a process flow diagram for the Director-style Manager of FIG. 2A.

FIG. 3 shows a process flow diagram for the Director-style Manager of FIG. 2. When beginning to convert a new movie from a particular director, director-style manager 211 is configured to obtain director-style characteristics from main memory 106, secondary memory 112 or database 150, such as directory-style parameters 199 or from any other location and determine if the current shot to convert is similar to another shot that the particular director has filmed before. If so, the processing components settings for a previously converted similar shot may be utilized to convert the current scene.

Processing starts at 300 when executable 210 begins executing on processor 107 for example. Step 300 may optionally include breaking a motion picture, such as a movie or television show or video into scenes and shots if the motion picture (for example includes more than one shot). In one or more embodiments of the invention, the system determines camera characteristics such as principal style, camera angle, camera motion, shot intimacy, actor positions based on image analysis and/or by obtaining input from an operator at 302. For example, a current shot to be converted from 2D to 3D is obtained at 302 and analyzed for camera characteristics as utilized by the director habitually. The shot is analyzed for lighting that is characteristic of the director at 304. This may include determining which of the 5 types of lighting is utilized as described previously. The shot is then analyzed for color characteristics used by the director at 306, for example a teal oriented background or orange oriented foreground area. This step may also aid in determining the camera angle for example. After analysis of the shot is complete for as many characteristics as desired, database 150 (or any other memory coupled with processor 107, such as director-style parameters 199) is accessed or searched for a similar shot from the specific director at 308, i.e., to obtain director-style characteristics associated shots made by the particular director. If a similar shot is found at 310, then processing continues at 312 with previously utilized director-style settings used to successfully convert the similar shot from the director. If no similar shot is found at 310, then the system accepts input from a stereographer, for example via Human Input Devices 130, at 314. Once the stereographer is satisfied with the depth changes applied by the system, the director-style manager 211 applies the settings obtained from the stereographer, or as obtained from director-style parameters 199 as associated with a similar shot previously converted, at 312 to the processing components or "conversion widgets" at 312. The executable 210 then converts the shot from 2D to 3D including any subset or all of the images 190 in the shot for example at 316. After reviewing the conversion, the stereographer may desire to slightly change some settings of the processing components to obtain a more acceptable result. The system accepts modifications to the processing components 200b-200n at 318 and updates director-style parameters 199 with the director-style characteristics with this shot type.

Figure 4:
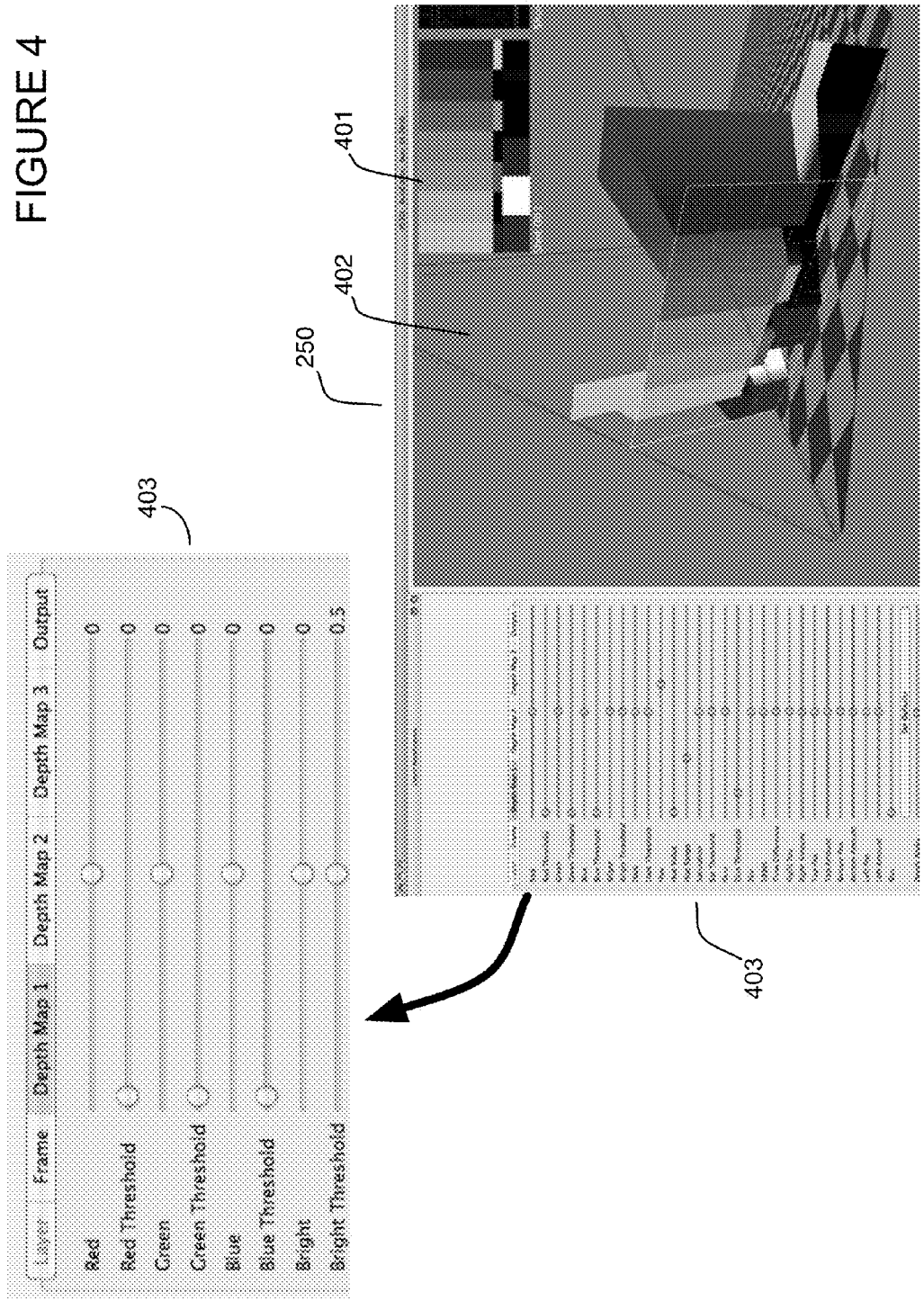
FIG. 4 shows an embodiment of the user interface of the system shown on the Display of FIG. 1 wherein the system is operating on a test pattern to show basic operation of a processing component.

FIG. 4 shows an embodiment of GUI 250 as shown in FIG. 2, of the system shown on Display Unit 110 of FIG. 1, wherein the system is operating on a test pattern to show basic operation of a processing component. First frame 401 in the shot is shown in the upper right of GUI 250. The settings for the various processing components 200b-200n are shown as graphical user interface elements 403 on the left side of GUI 250, and which are also shown enlarged in the upper left of the figure. Each processing component can have as many parameter settings as necessary to obtain desired settings for that particular processing component and associated method of converting a 2D image to a 3D image. Input interface 201 of each processing component (see FIG. 2) can be queried for the list of parameters needed and the type of interface widget to use, which is then used by executable 210 to create graphical user interface elements 403 on the left side of GUI 250. Each processing component 200b-200n thus processes each frame input via input interface 201 in each shot according to the settings associated with the respective graphical user interface elements 403 to produce an intermediate depth map to apply to the frames and which are output to the director-style manager via output interface 203 of each processing component. After all processing components 200b-200n operate on 2D image 190, such as first frame 401, the 3D image pair, or any other 3D oriented view 402, such as the perspective view shown, is thus created and displayed in GUI 250.

As shown in the left portion of GUI 250, in the processing component settings area, where graphical user interface elements 403 are displayed, "Hue" and "Hue Value" are set to values that deviate from the nominal setting and "Hue Range" is also set to a value that deviates from the nominal setting. This indicates to the "Hue" processing component that processing should occur for this shot using settings as indicated to convert the frames of the shot from 2D to 3D. As shown in the right portion of graphical user interface 250, setting "Hue Range" to a larger number (slider set to the right), adds depth to areas of the image that have the color red. Since the pattern has multiple colors and red is shown with a greater depth (to the right in the figure), immediate feedback to the user who is setting depth based on the processing component associated graphical user interface elements 403 is thus achieved. Setting ranges for objects in an image with slightly different colors, for example blue for sky in the background and orange for objects in the foreground enables automatic depth assignment to be performed for directors that utilize this type of lighting in a shot. Although Hue graphical user interface elements can be implemented with a color wheel or other input element to give the stereographer a more intuitive idea of what the settings signify, simple interface elements as shown here, i.e., sliders, can also be used for an extremely simple interface.

Figure 5:
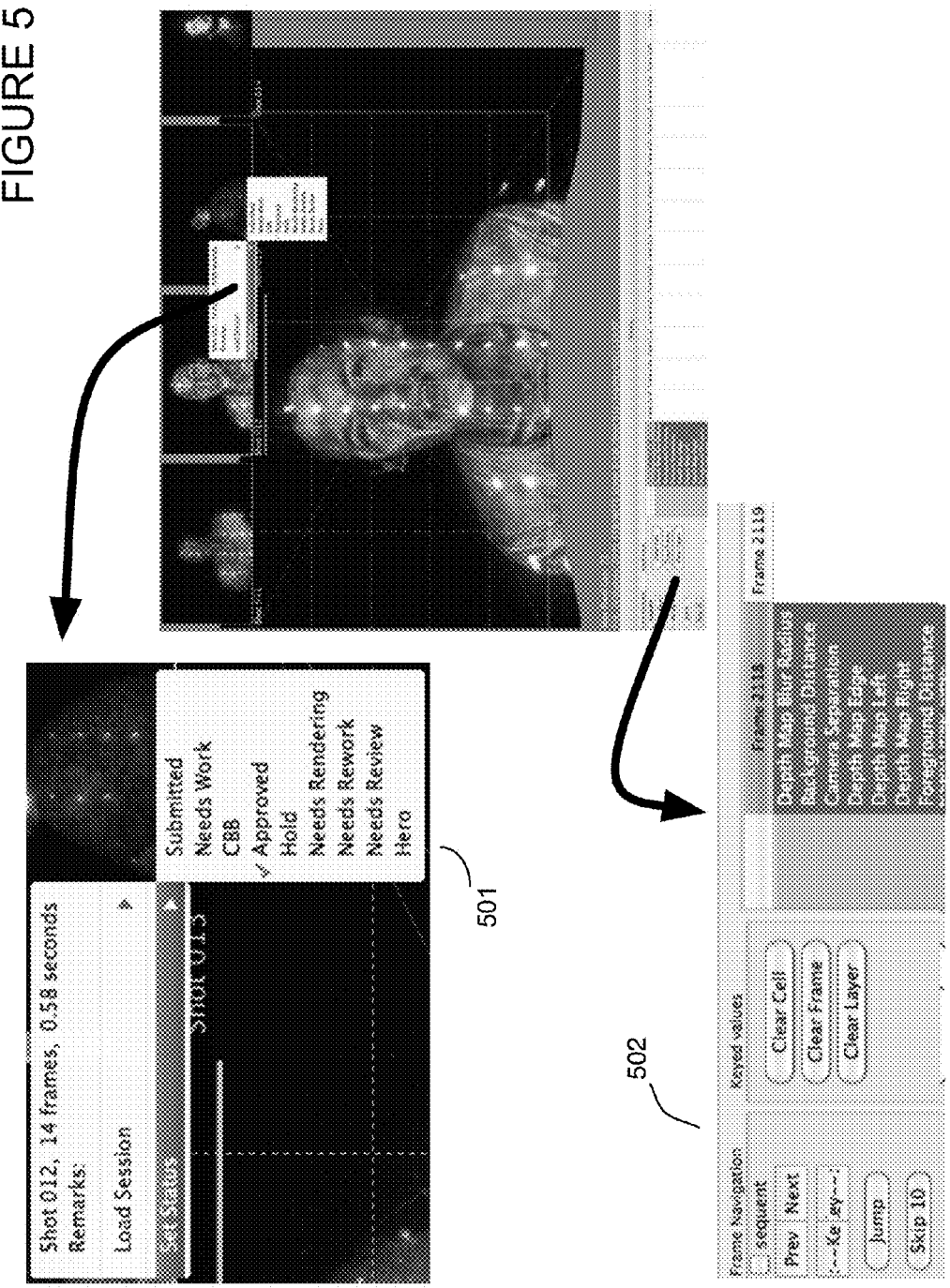
FIG. 5 shows an embodiment of the user interface of the system showing workflow graphical user interface components zoomed on the upper left and frame navigation, keyed values including cell, frame and layer and a timeline of processing component invocations along the bottom of the user interface zoomed on the bottom left along with a 2D image in the center of the screen to be converted to 3D.

FIG. 5 shows an embodiment of GUI 250 of the system showing workflow graphical user interface components 501 shown zoomed in on the upper left. In addition, frame navigation, keyed values including cell, frame and layer and a timeline of processing component invocations 502 are shown along the bottom of GUI 250 along the bottom of the user interface zoomed in on the bottom left along with a 2D image in the center of the screen, as shown in the right of the figure, to be converted to 3D. The workflow graphical user interface components 501 allow for entry of status such as "submitted", "needs work", "CBB" or "could be better", "approved", "hold", "needs rendering", "needs rework", "needs review" and "hero" which signifies a particular excellent shot that has been converted from 2D to 3D. Any subset or other set of workflow settings may be utilized in one or more embodiments of the invention to allow for the management of the conversion process to occur. The frame navigation components and keyed value components allow for the traversal of frames and setting of key frame values associated with a cell, frame or layer. Key frames allow for the tweening of values between key frames so that the settings do not need to be entered for every single frame, but rather can be interpolated between key frames. The timeline of processing component invocations are shown for each frame where the processing components are set or altered, so that the processing that occurs in each frame can be visually reviewed as is shown in the bottom right portion of area 502.

Figure 6:
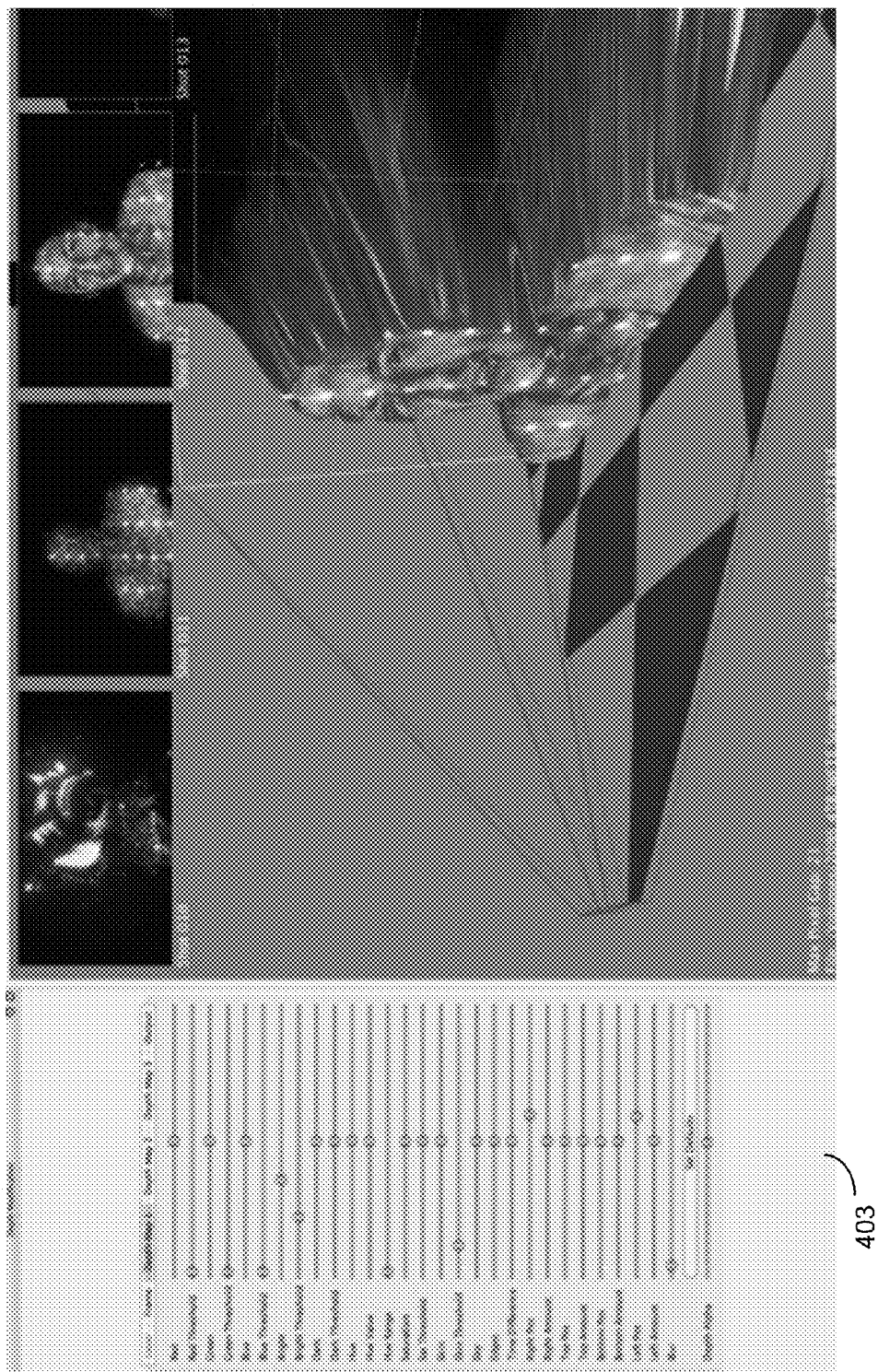
FIG. 6 shows an embodiment of the invention with a processing component for "bright" invoked.

FIG. 6 shows an embodiment of the invention with a processing component for "bright" invoked. All values over a certain luminosity value are thus pulled forward. This is achieved by setting the processing component settings in 403 to the desired value.

Figure 7:
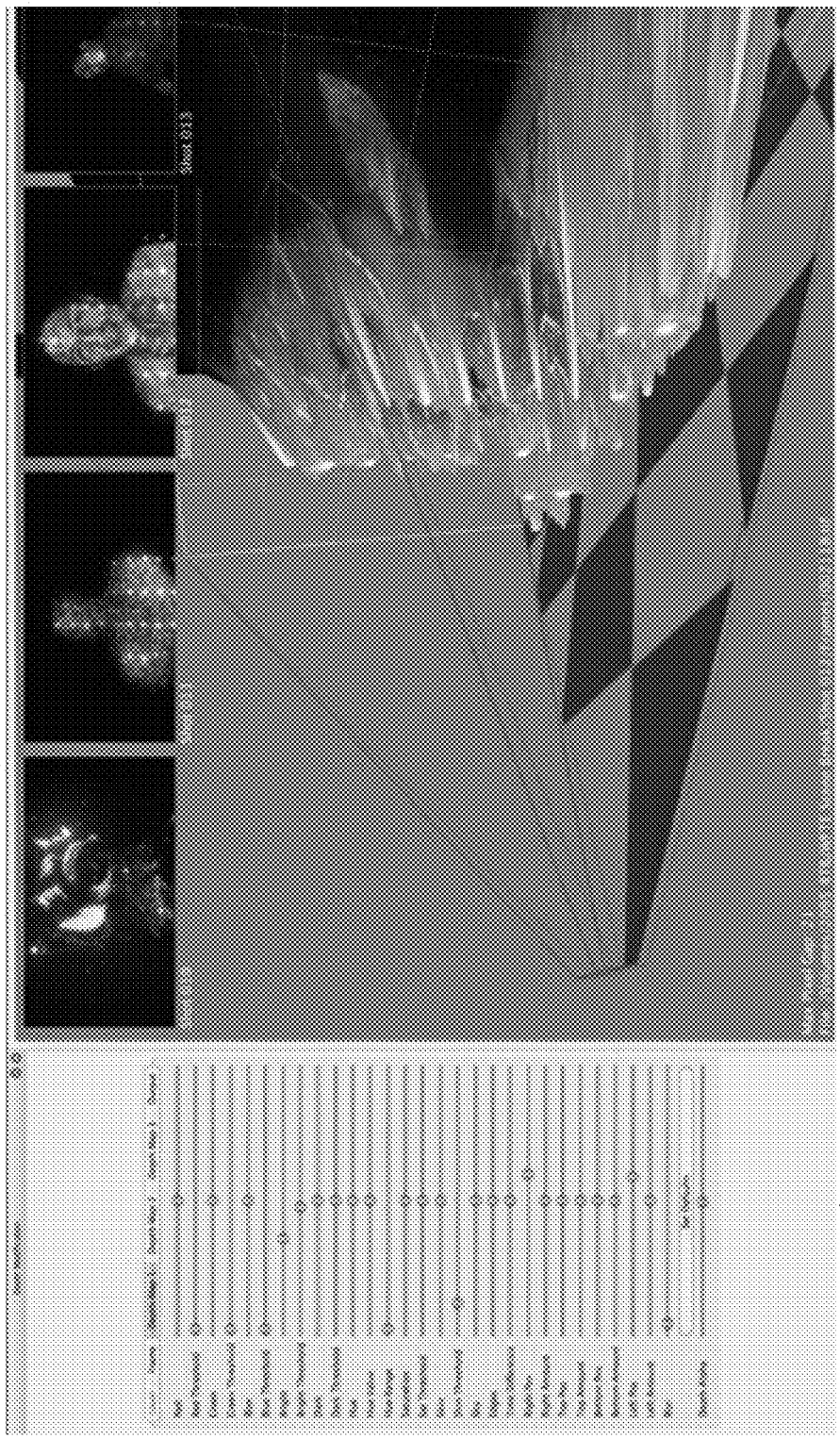
FIG. 7 shows an embodiment of the invention with the "bright" processing component invoked with a low threshold so that only very bright areas of the image are "pulled forward" which means that their depth is set to be nearer the viewer.

FIG. 7 shows an embodiment of the invention with the "bright" processing component invoked with a low threshold so that only bright areas over a threshold value somewhat between the brightest and darkest areas of the person in the image are "pulled forward" which means that their depth is set to be nearer the viewer, while darker portions are set to be farther away from the viewer.

Figure 8:
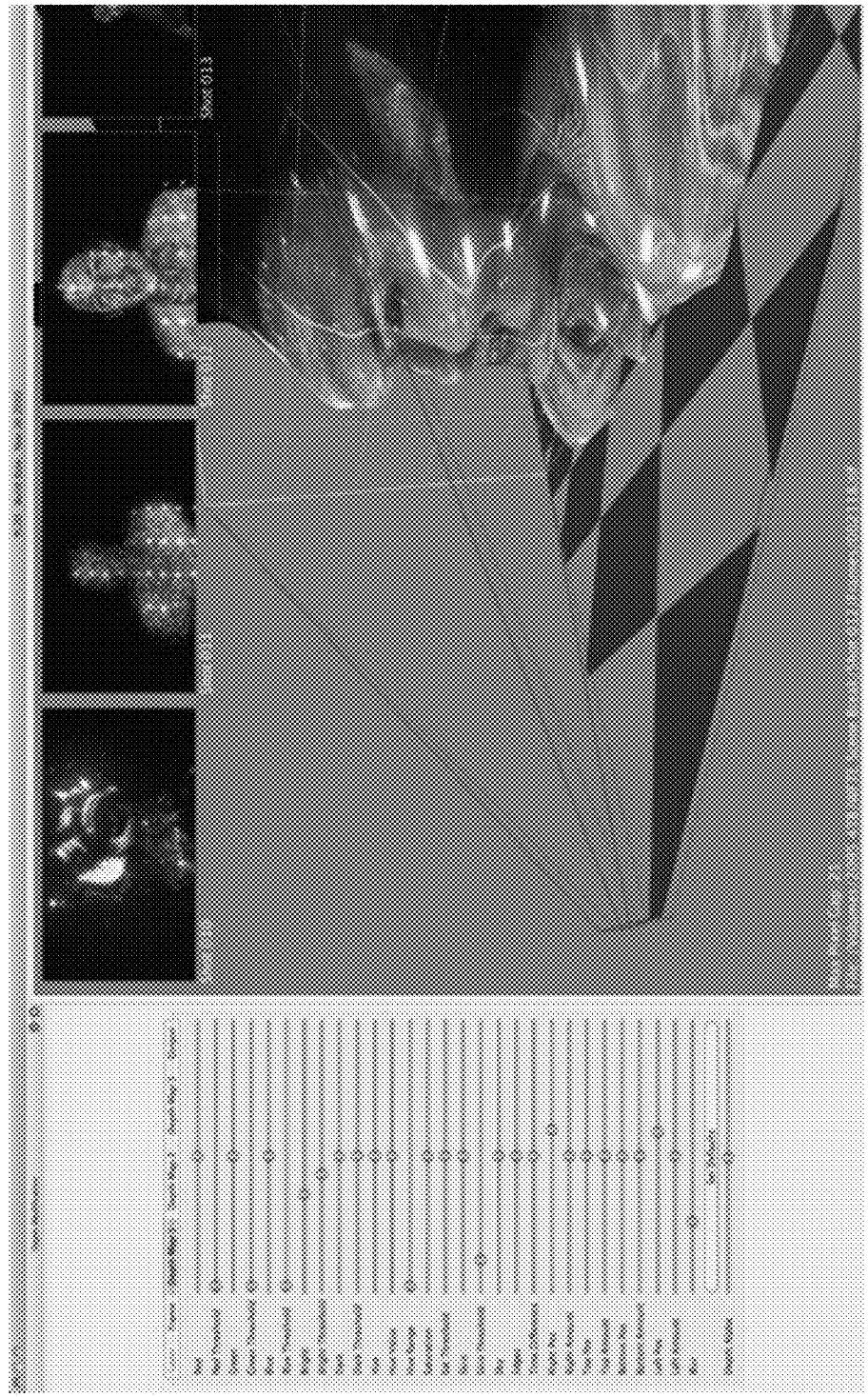
FIG. 8 shows an embodiment of the invention with the "bright" processing component invoked with a low threshold, but with a depth blur processing component also invoked.

FIG. 8 shows an embodiment of the invention with the "bright" processing component invoked with a low threshold, but with a depth blur processing component also invoked. In this manner brightness can be chosen to control depth as per FIG. 6, the choice may be performed using a threshold as per FIG. 7 and the depth may be averaged over an area or "depth blurred" as in FIG. 8. By determining the type of shot that the director is using, i.e., by comparing the color settings, camera settings, and other director-style characteristics (as stored in director-style parameters 199) of the shot with statistics from other shots that the director has done before (see FIG. 3), automatic conversion is thus accomplished. Since the particular director that shot the shot shown in FIGS. 6-8 has shot many music videos with dark backgrounds and bright characters, this type of conversion, that has been optimized using the processing component settings to obtain the desired depth conversion can be effectively remembered by the system and used again and again for the director's shots.

Figure 9:
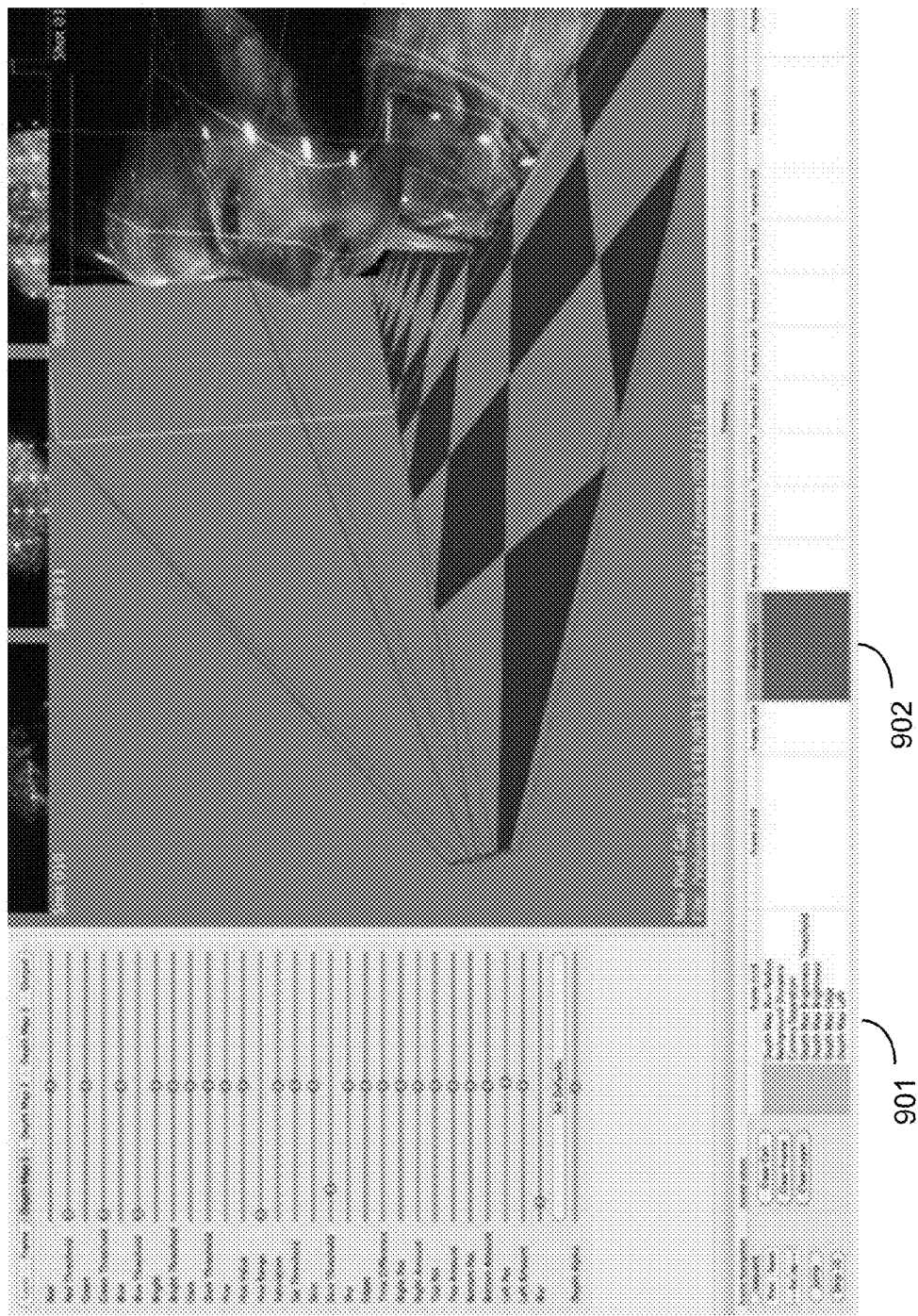
FIG. 9 shows an embodiment of the invention with no processing components set to deviate from their default operation, but wherein the frame is "tweened" between the image shown in FIG. 8 and the image shown in FIG. 10.
Figure 10:
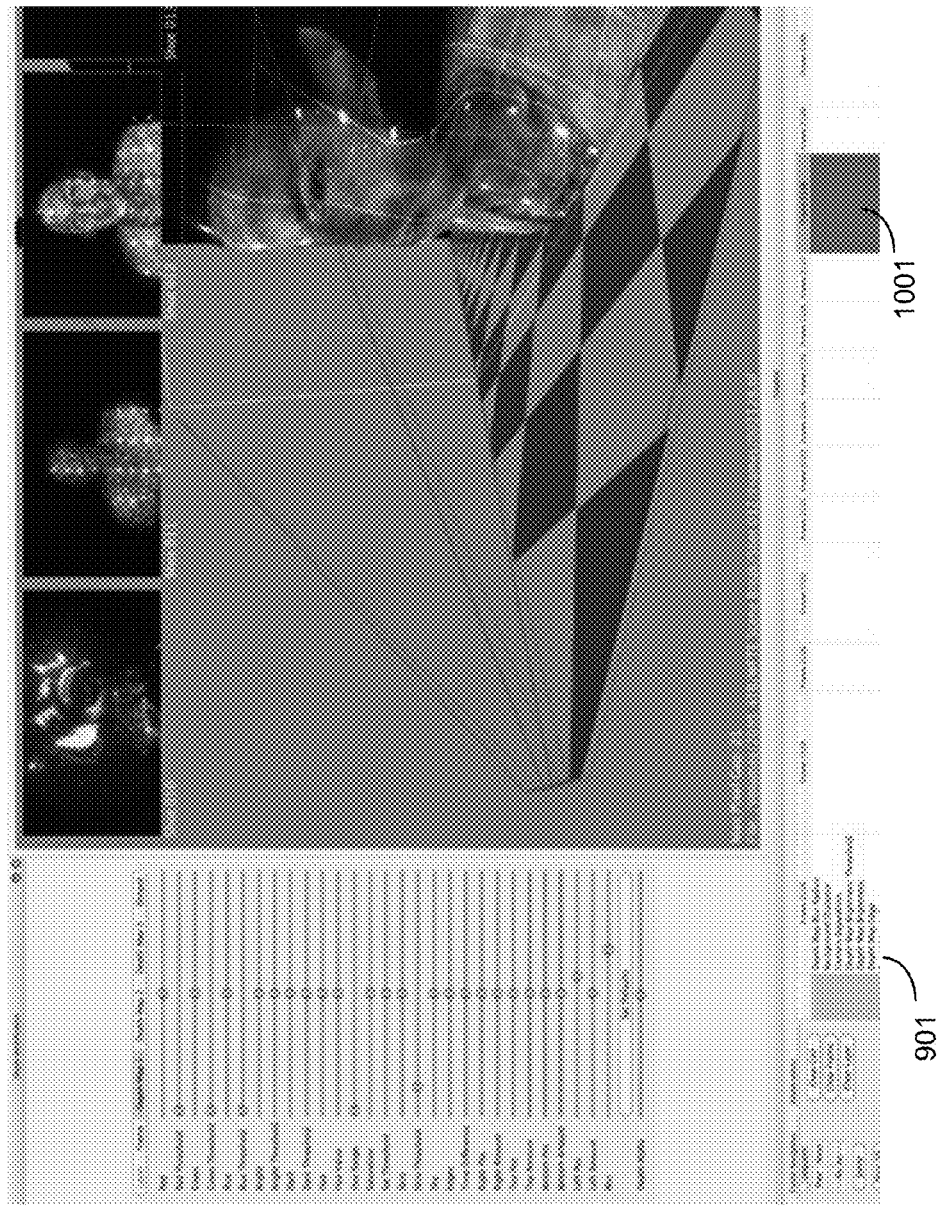
FIG. 10 shows an embodiment of the invention with the Depth Map Blur Radius set to a higher value, to show how the image in FIG. 9 is "tweened" regardless of the number of processing components set for individual frames.

FIG. 9 shows an embodiment of the invention with no processing components set to deviate from their default operation, but wherein frame 902 is "tweened" between the image shown in FIG. 8, i.e., key frame 901 and the image shown in FIG. 10.

FIG. 10 shows an embodiment of the invention with the Depth Map Blur Radius set to a higher value, to show how the image in FIG. 9 is "tweened" regardless of the number of processing components set for individual frames between key frame 901 and frame 1001.

Figure 11:
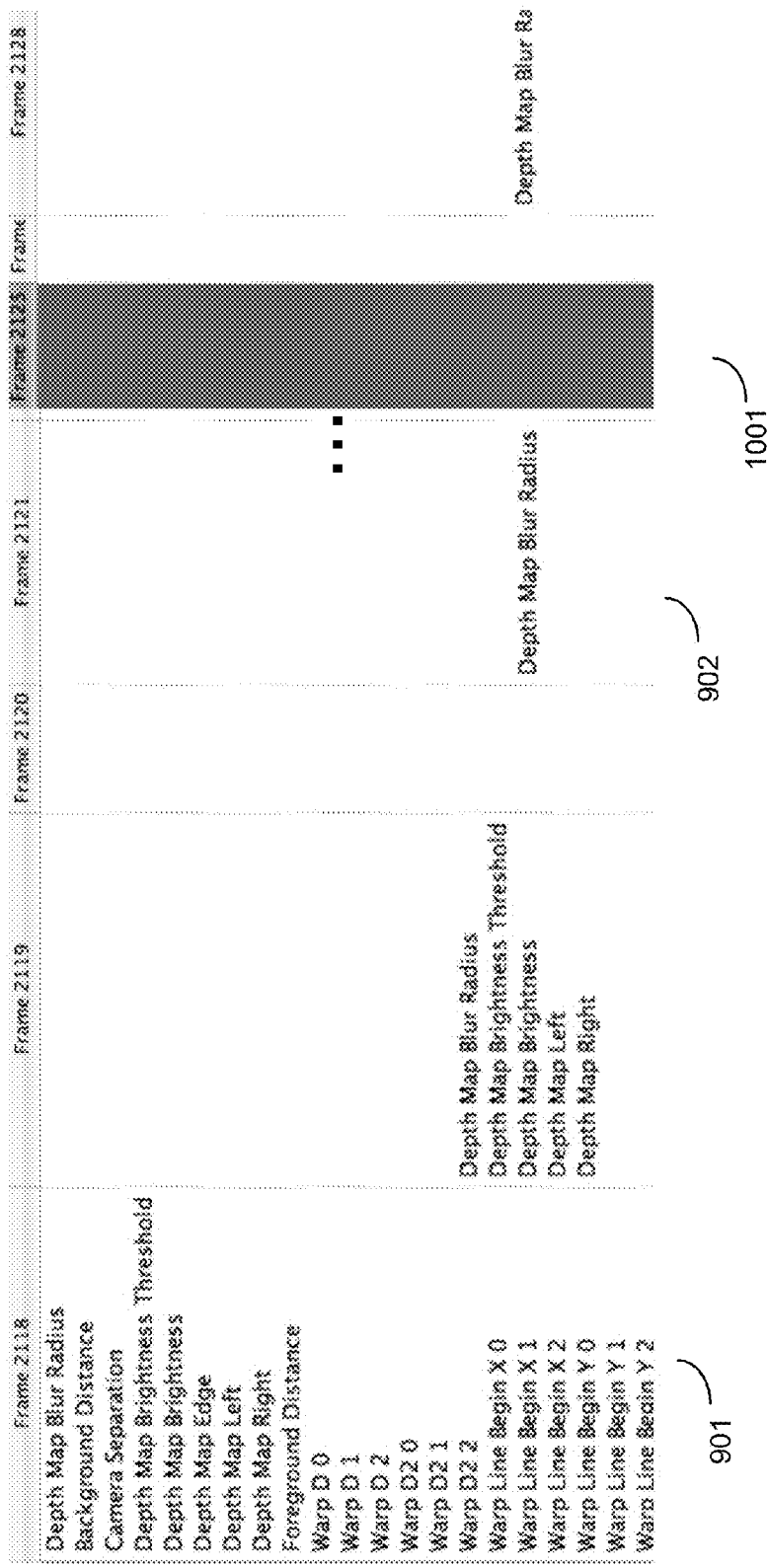
FIG. 11 shows the particular processing components that are invoked in each frame, wherein each of the processing components are "tweened" individually if their settings change in any subsequent frame.

FIG. 11 shows a partial list of the particular processing components that are invoked in each frame, wherein each of the processing components are "tweened" individually if their settings change in any subsequent frame.

Figure 12:
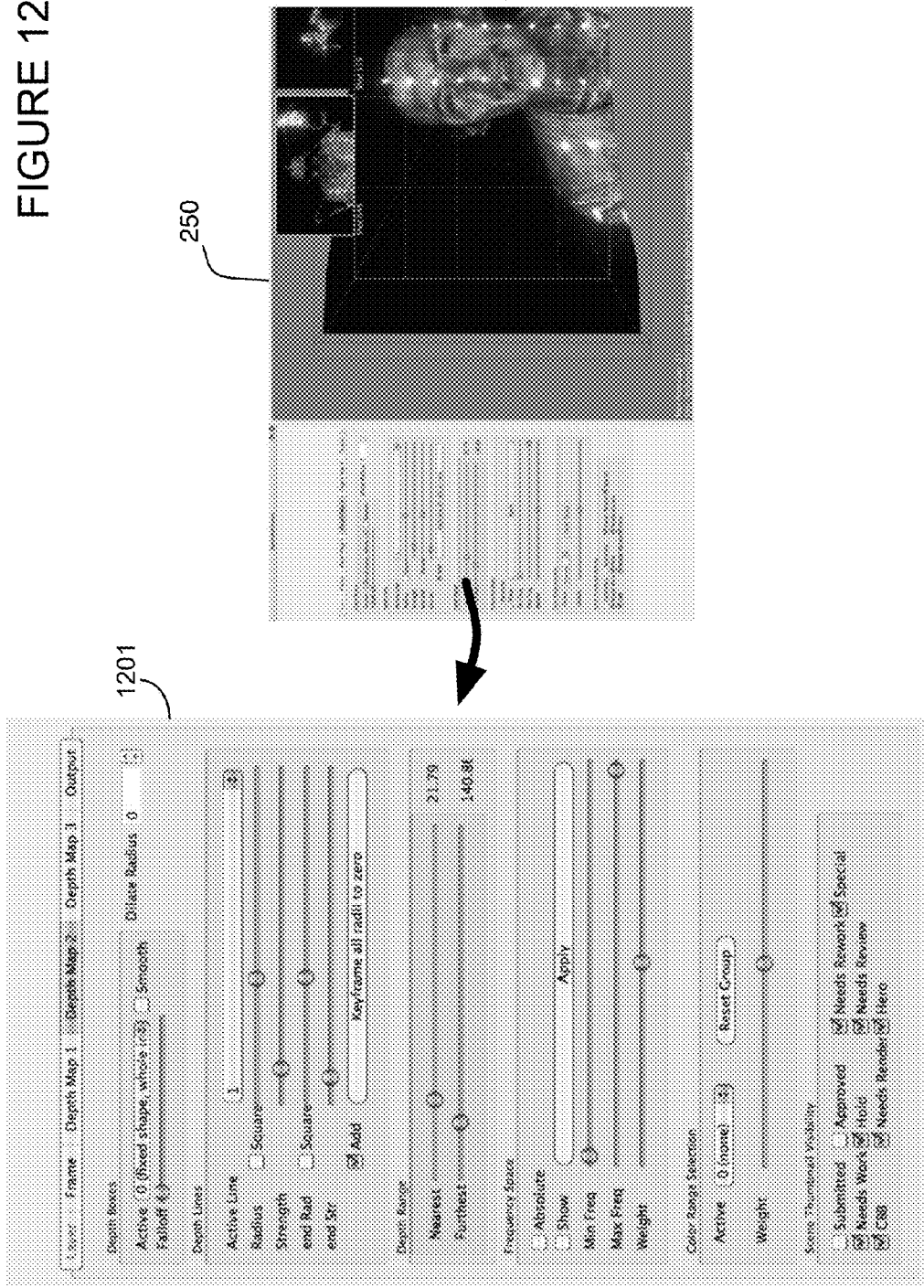
FIG. 12 shows the next level of general depth settings provided by the system executable including allowing particular processing components to work in "depth boxes" or designated areas, or to invoke "depth lines" for cylinder based depth additions, or to set a "depth range" to set the overall max and min ranges for the conversion, or to show the "frequency space" which shows the Fast Fourier Transform of the image, "Color Range Selection" to set the color range of the image and in addition, to show particular work flow "Thumbnails" to allow shots to be graded for workflow purposes.

FIG. 12 shows the optional next level of general depth settings provided by the system executable including allowing particular processing components to work in "depth boxes" or designated areas, or to invoke "depth lines" for cylinder based depth additions, or to set a "depth range" to set the overall max and min ranges for the conversion, or to show the "frequency space" which shows the Fast Fourier Transform of the image, "Color Range Selection" to set the color range of the image and in addition, to show particular work flow "Thumbnails" to allow shots to be graded for workflow purposes.

Figure 13:
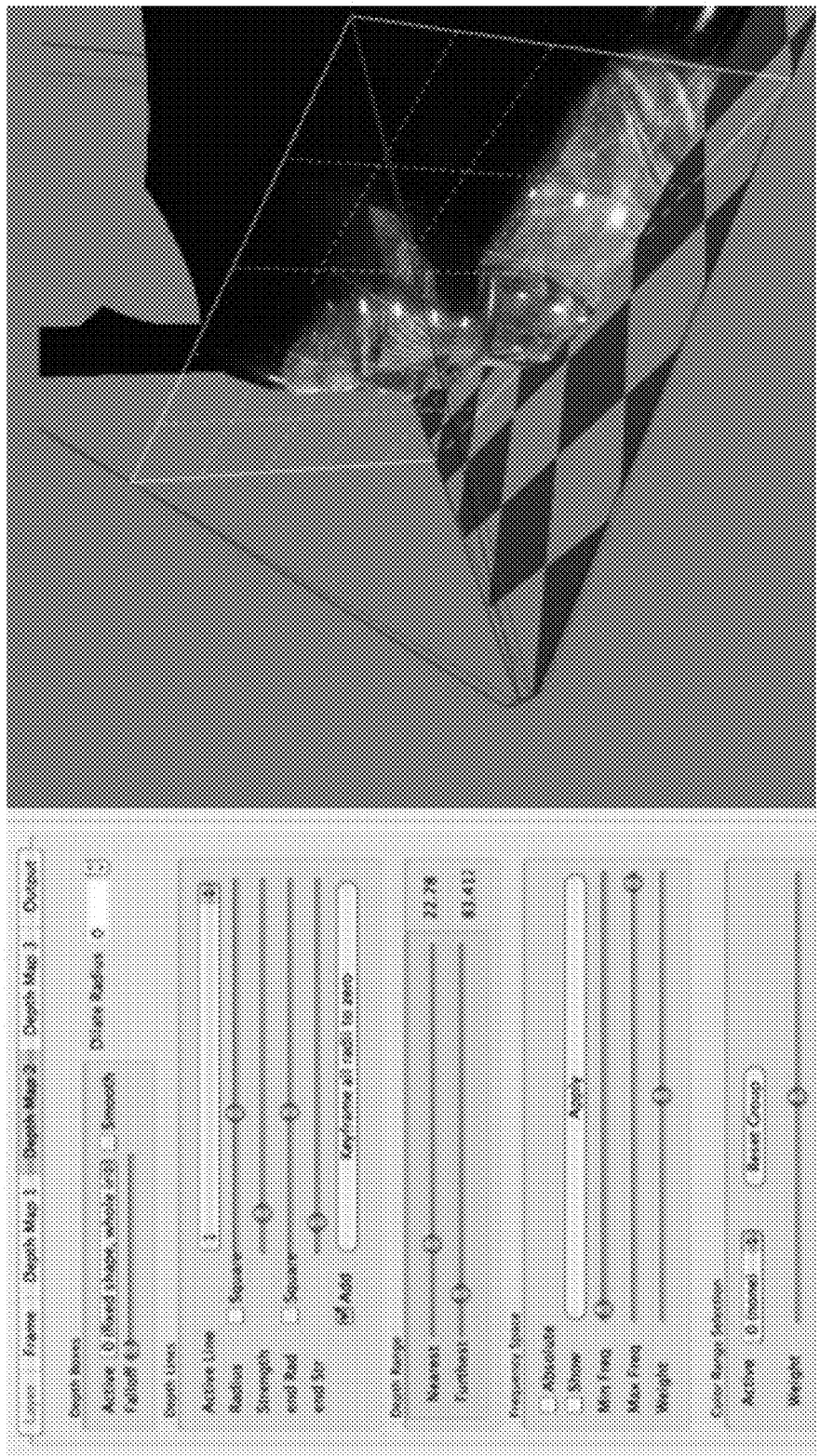
FIG. 13 shows a perspective view of the image of FIG. 12 with particular depth range set via the user interface on the left side of the interface.

FIG. 13 shows a perspective view of the image of FIG. 12 with particular depth range set via the user interface on the left side of the interface.

Figure 14:
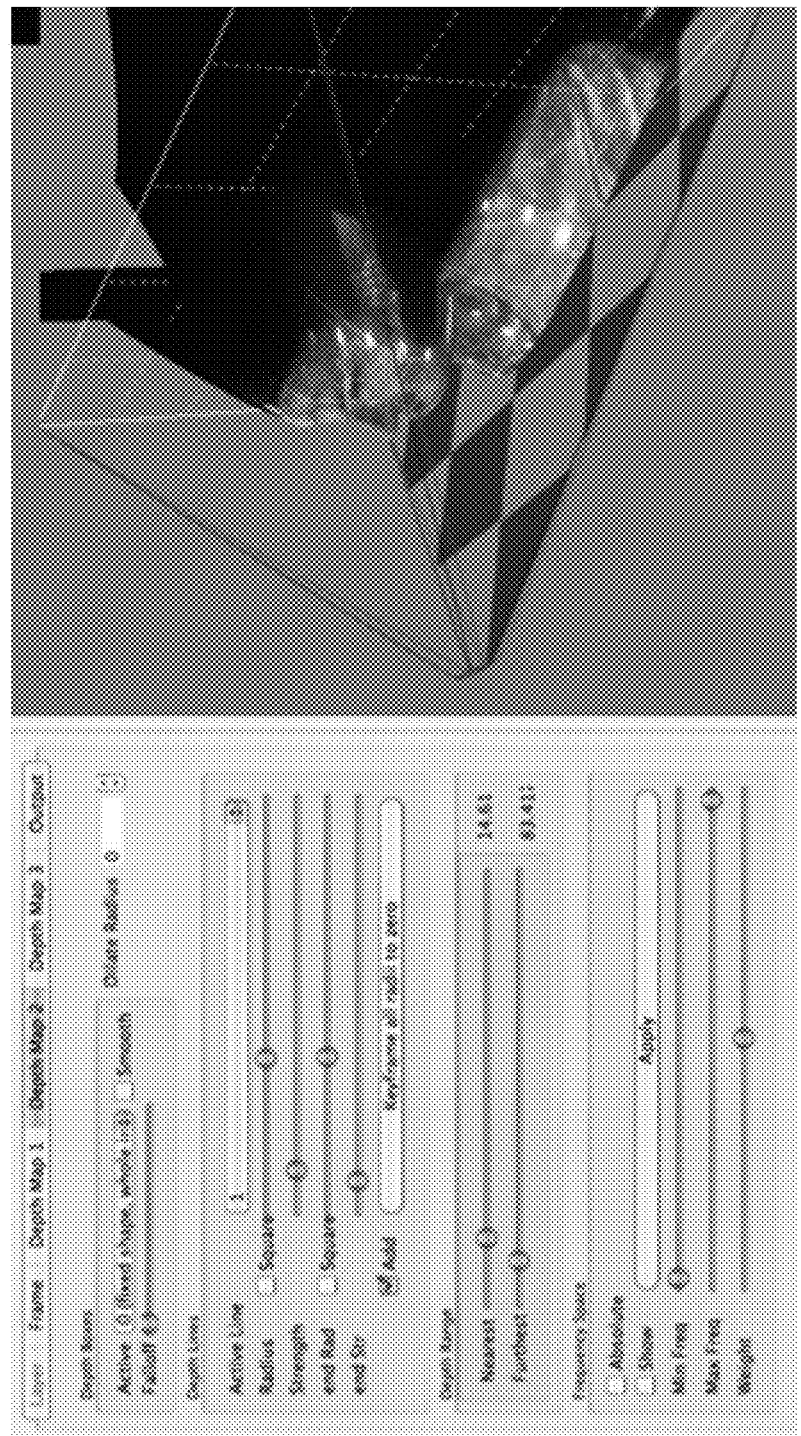
FIG. 14 shows altered settings for "depth range" compared to FIG. 13.

FIG. 14 shows altered settings for "depth range" compared to FIG. 13. The nose and face of the person shown in the figure are nearer, as the "Nearest" slider has set the value of 14.61 as opposed to the 22.78 setting in FIG. 13 for "Nearest". This has the effect of stretching the object in the frame. These settings can be applied to each frame or to each shot to keep the Nearest and Farthest values for all objects in the frames of the shot within a desired range for example.

Figure 15:
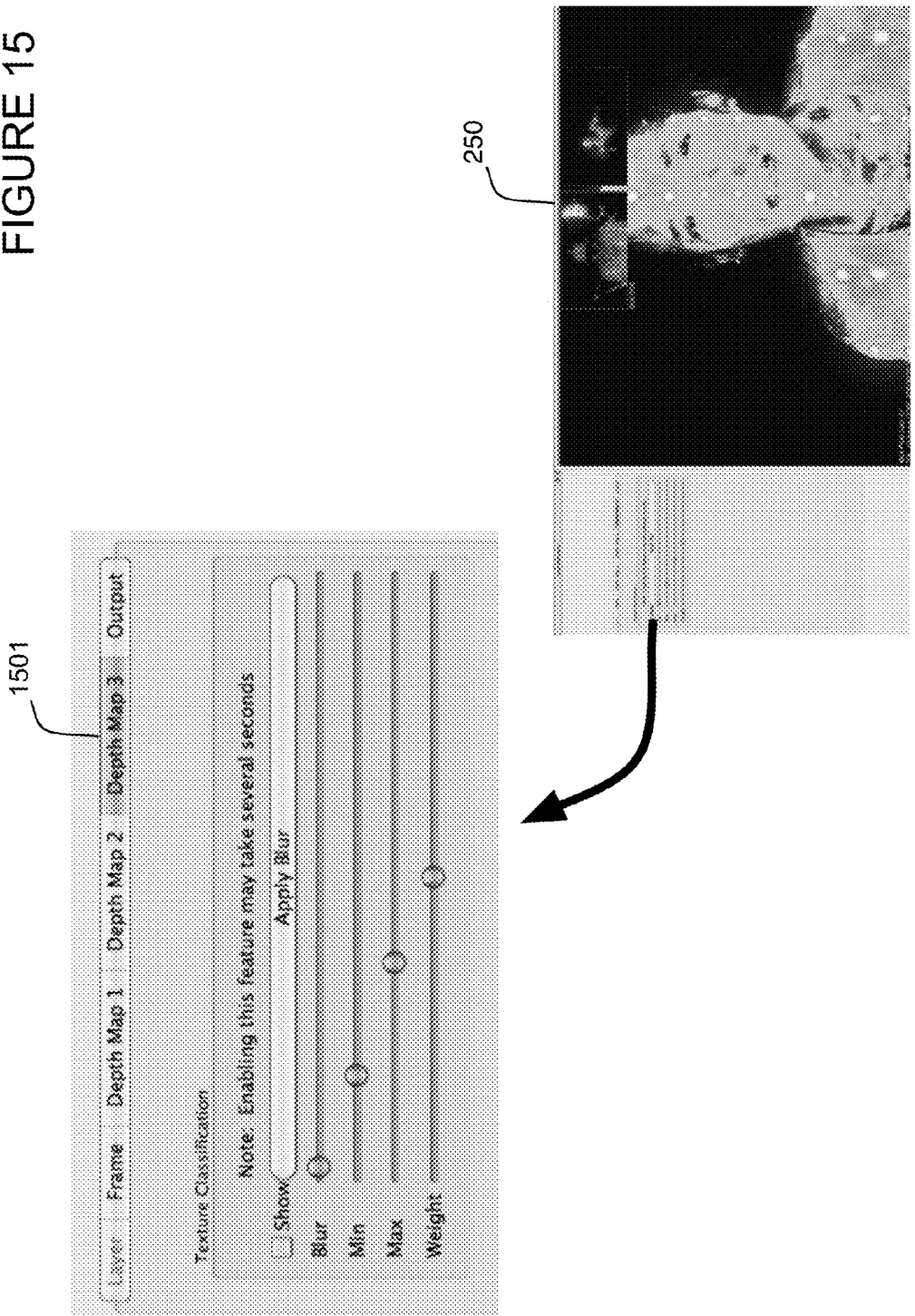
FIG. 15 shows another level of depth settings related to texture based classification of images and the associated depth settings associated with objects that have the same type of texture.

FIG. 15 shows another optional level of depth settings 1501 related to texture based classification of images and the associated depth settings associated with objects that have the same type of texture. Since the object in the screen is a highly rasterized image of a human, characteristic of the director's style, a texture detecting processing component readily is able to detect the object in the frame and apply depth as desired. Any type of texture detector can be utilized with embodiments of the invention in setting depth automatically.

In addition, any type of image detection object may also be utilized with embodiments of the system by creating a processing component for the type of detector as shown in FIG. 3. By dropping the processing component in a directory or compiling the processing component into executable 210, the processing element is thus capable of being utilized by embodiments of the invention to search for director-style characteristics in a shot and also to apply depth in portions of the image determined to be appropriate by the processing component. For example, any type of face recognition software may be utilized as a processing component to determine where a nose, mouth, eyes, etc., is located in an image and appropriately add depth to the image based on the detected coordinates.

Figure 16:
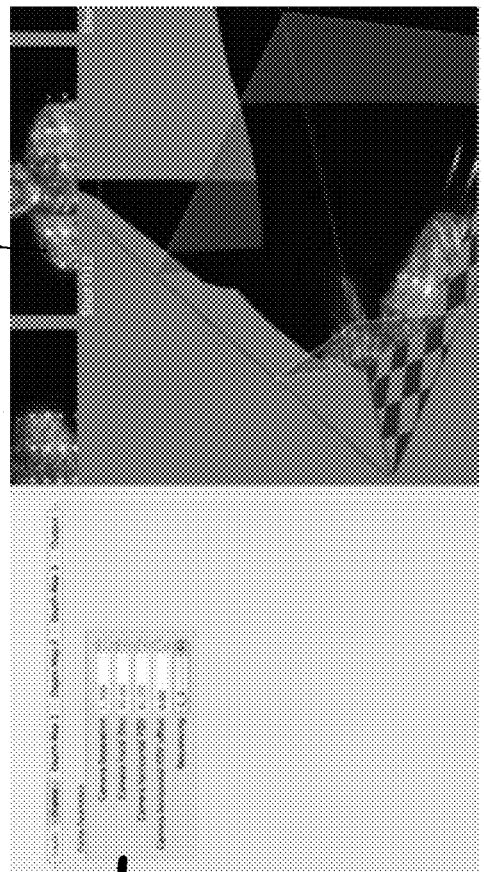
FIG. 16 shows the acceptable viewing planes from nearest and farthest from the viewer, which allows for a stereographer to determine whether too much or too little depth has been added based on the minimum and maximum acceptable amounts of depth for the project.

FIG. 16 shows frame parameters user interface 1601 along with the acceptable viewing planes from nearest and farthest from the viewer in GUI 250, which allows for a stereographer to determine whether too much or too little depth has been added based on the minimum and maximum acceptable amounts of depth for the project. Each frame can have different camera settings applied that are tweened between frames for example.

Figure 17:
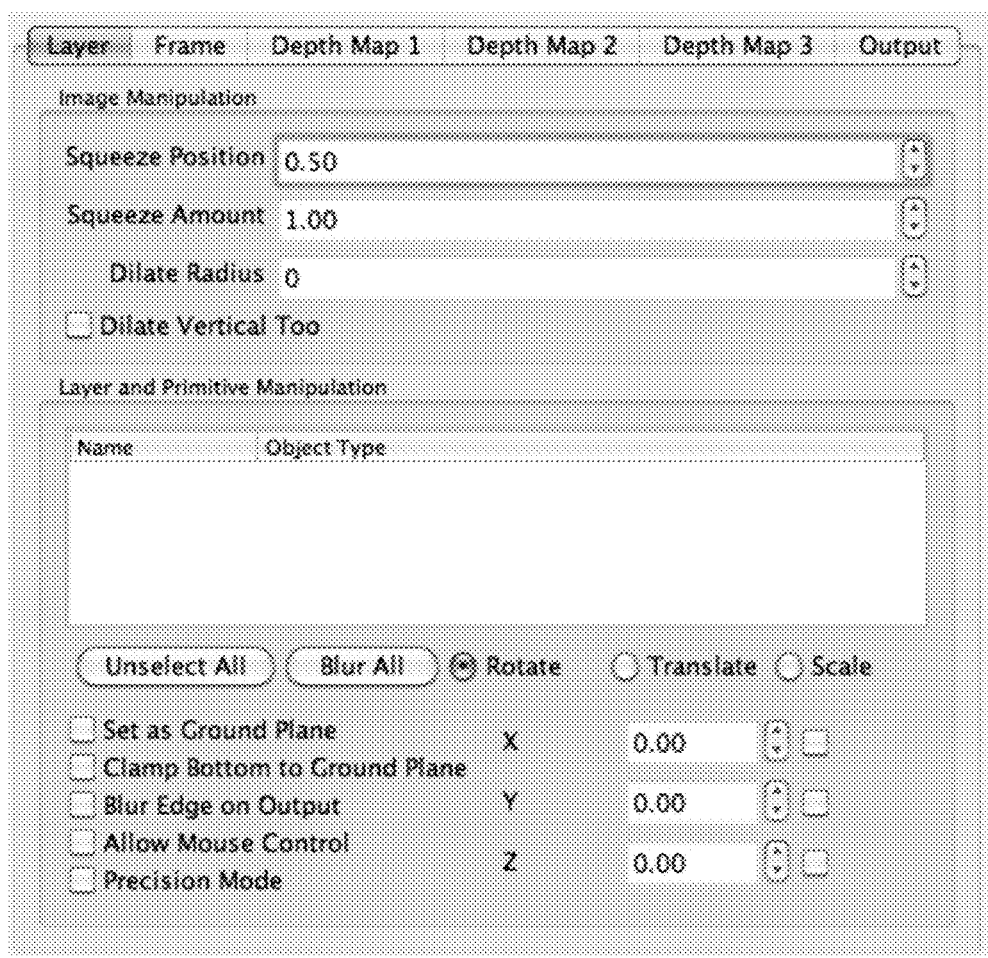
FIG. 17 shows the Layer interface for adding layers for any projects that also include masks that embodiments of the invention may process around for example.

FIG. 17 shows the Layer interface for adding layers for any projects that also include masks that embodiments of the invention may process around for example. Each layer may be "squeezed" or stretched and layers may be ordered in the table in the "Layer and Primitive Manipulation" list in the middle of the interface. The layers may be blurred, set to Ground Plane, clamped or otherwise linked in depth to the Ground Plane, have blurred edges in depth for example. Each layer can be rotated, translated or scaled to properly fit the image being converted.

Figure 18:
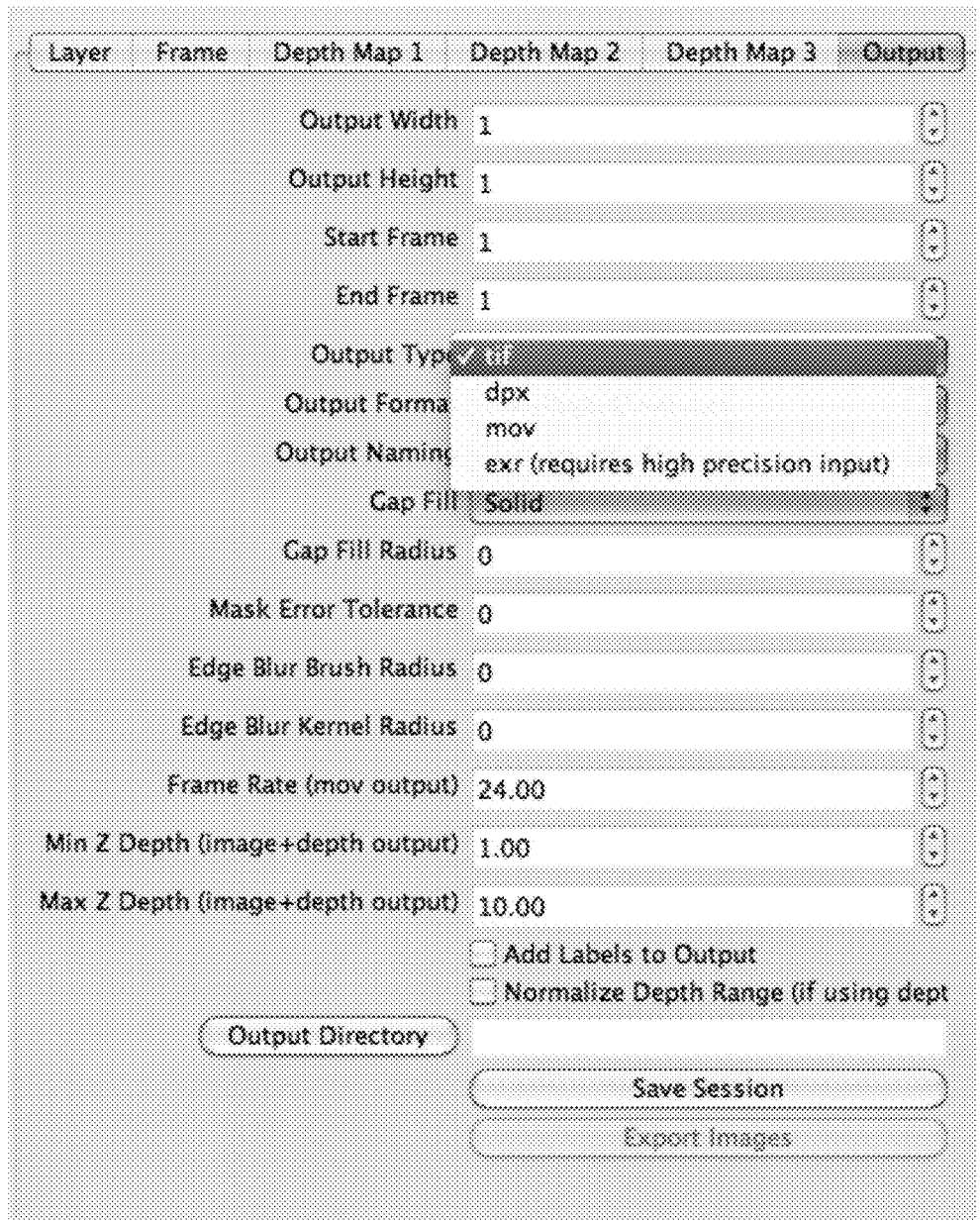
FIG. 18 shows an interface that the system utilizes to obtain the desired file output type for the converted 3D image(s).

FIG. 18 shows an interface that the system utilizes to obtain the desired file output type for the converted 3D image(s). Tif, DPX, MOV and EXR formats may be supported along with any other RGBAZ or any other file format desired in the conversion output process depending on the type of technology desired for viewing the converted images.

Figure 19:
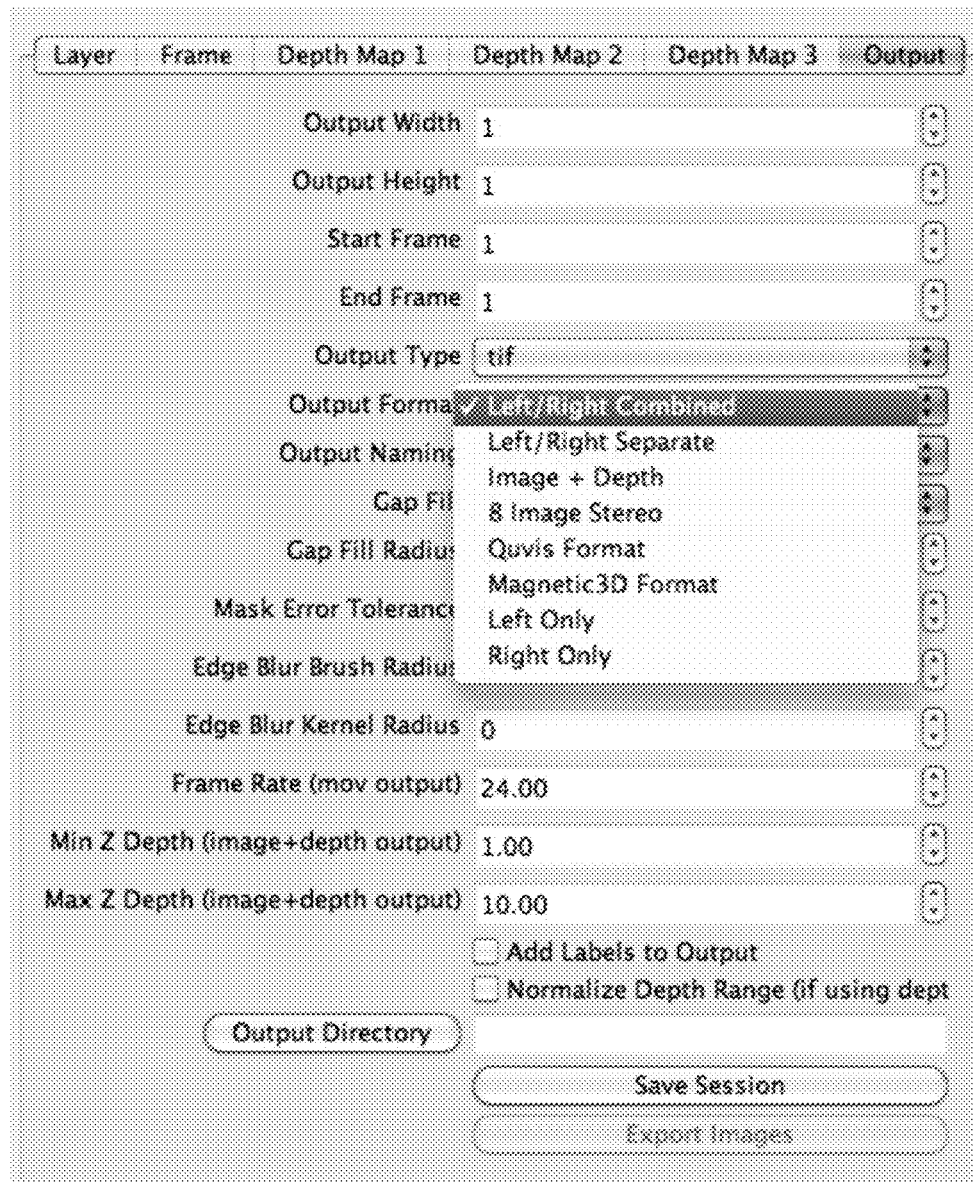
FIG. 19 shows the interface that the system utilizes to obtain the desired file output format for the converted 3D image(s).

FIG. 19 shows the interface that the system utilizes to obtain the desired file output format for the converted 3D image(s). Left/Right Combined, Left/Right Separate, Image+Depth, 8 Image Stereo, QUVIS® Format, MAGNETIC3D® Format, Left Only or Right Only images may be output. Any other format for output may also be supported by one or more embodiments of the invention as desired.

Figure 20:
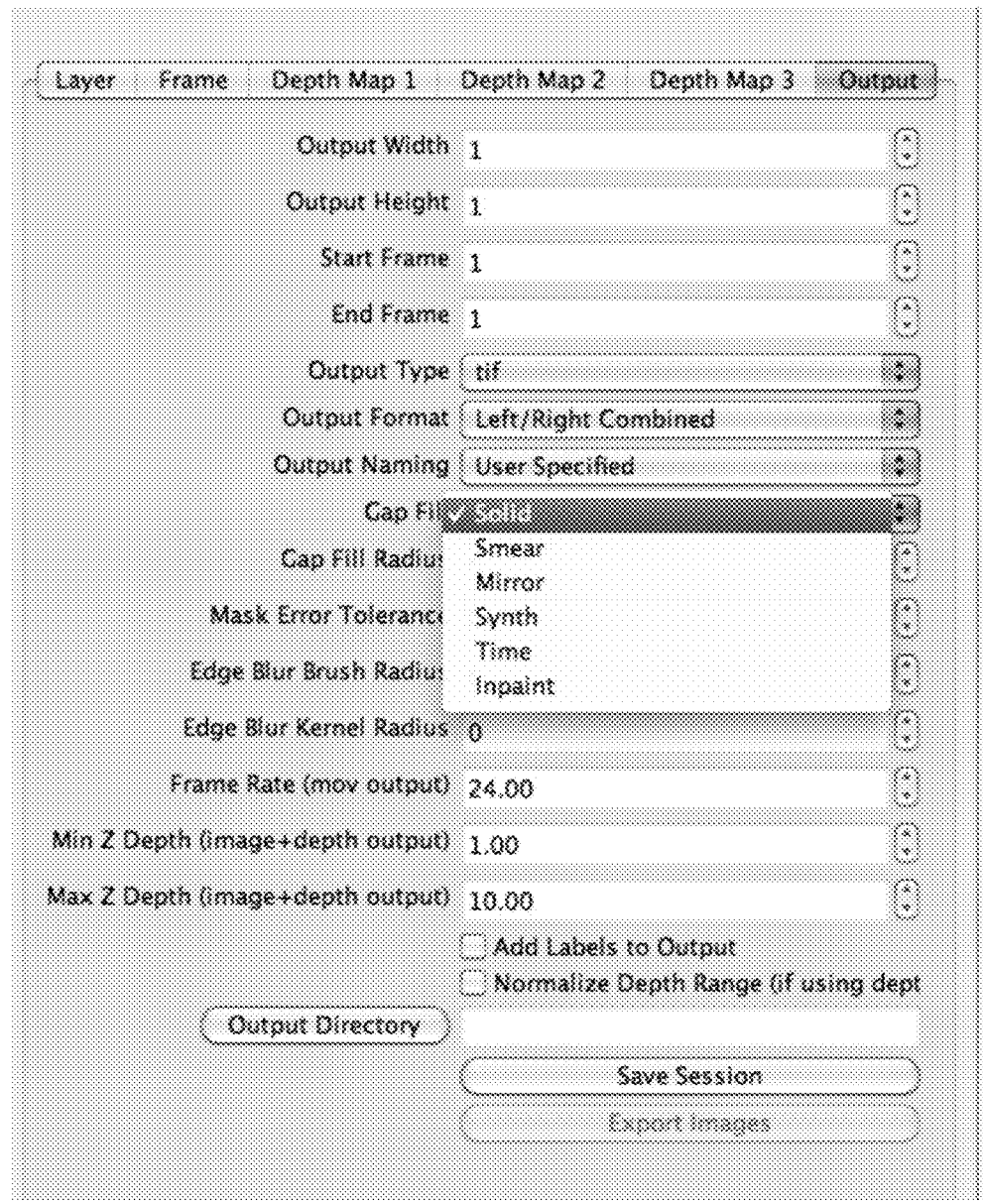
FIG. 20 shows the interface that the system utilizes for gap fill for the converted 3D image(s), wherein embodiments of the invention may also utilize a layer with generated image data for any missing data from a frame so that realistic image data may be obtained from the layer instead of synthesized.

FIG. 20 shows the interface that the system utilizes for gap fill for the converted 3D image(s), wherein embodiments of the invention may also utilize a layer with generated image data for any missing data from a frame so that realistic image data may be obtained from the layer instead of synthesized. As shown, smear gap fill takes colors from each side of the gap and combines them to form an acceptable color to fill the gap with. Mirror takes color from each side of the gap and mirrors the colors from each side of the gap about a midpoint of the gap. Synth looks through the whole image for small pixel chunks, for example 4 pixel chunks that could be used to file the gap based on a texture or colors of a group of pixels near the gap. Inpaint is similar to Synth, but uses a polar search area to speed the search for appropriate pixels to use for the gap. "Time" gap fill looks for missing pixels in other frames for the particular area of the gap, i.e., where the background was not covered by a foreground object so as to use the actual image data that is missing in the current frame when shifting a foreground object horizontally for example to add perceived depth during conversion.

Figure 21:
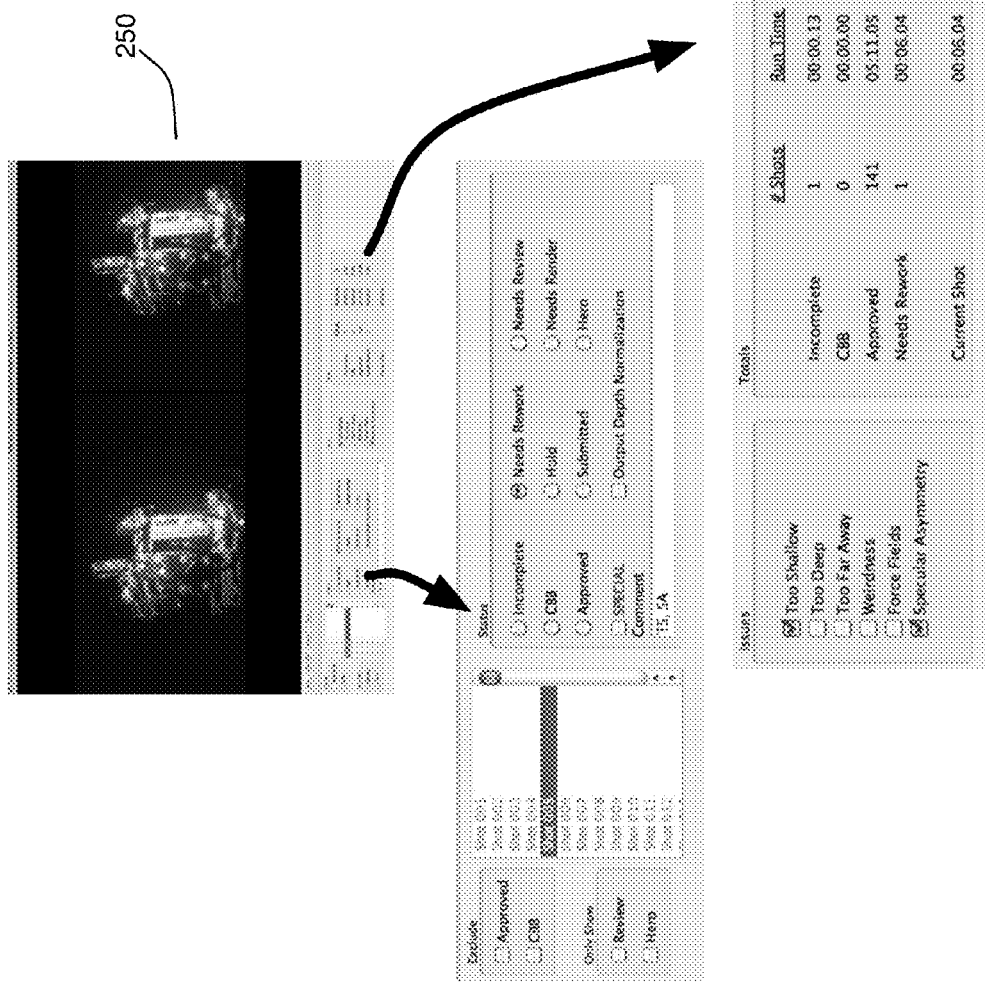
FIG. 21 shows the reviewing status user interface that displays and obtains Status of the shot, including Approved, "CBB" which stands for Could Be Better, Hero, meaning that the shot is flagged for promotional use, Needs Rework, etc.

FIG. 21 shows the reviewing status user interface in the middle portion of the figure as presented in GUI 250 that displays and obtains Status of the shot, including Approved, "CBB" which stands for Could Be Better, Hero, meaning that the shot is flagged for promotional use, Needs Rework, etc. The Issues and Totals sections of the reviewing status interface are shown in the bottom portion of the figure as presented in GUI 250. The Issues may include any type of issue that is observed in the reviewing process for a shot, including "Too Shallow", "Too Deep", "Too Far Away", "Weirdness", "Force Fields", "Specular Asymmetry" or any other issue. The Totals area can show how many shots are Incomplete, "CBB" or Could Be Better, Approved or Needs Rework. Along with the status for each shot, the number of shots and run time and percentages for the various shots in each category of completion can also be shown. Any other information related to the shots may also be displayed in this area as desired.

Figure 22:
FIG. 22 shows the user interface that allows for the desired viewing mode to be selected for review of the shots.

FIG. 22 shows the user interface that allows for the desired viewing mode to be selected for review of the shots. The modes may be include "2D Ortho", "2D Left", "2D Right", "2D Center", "2D Side by Side", "2D Difference", "3D Perspective", "3D Anaglyph", or any other viewing type as shown.

FIG. 23 shows the workflow interface that shows which shots have been completed or need rework, etc. This concise area allows for a stereographer to quickly see which shots have been completed or not and which shots need to be worked on or reworked.

While the invention herein disclosed has been described by means of specific embodiments and applications thereof, numerous modifications and variations could be made thereto by those skilled in the art without departing from the scope of the invention set forth in the claims.

What is claimed is:

1. A system for director-style based 2D to 3D movie conversion comprising:
   memory configured to store at least one director-style characteristic;
   at least one computer configured to
      break a series of related images comprising a motion picture made by a particular director into one or more shots that each comprise one or more two-dimensional or 2D format images wherein said particular director is a particular person that directs said motion picture;
      analyze a current shot selected from said one or more shots and determine at least one director-style characteristic associated with said current shot;
      access a director-style parameters data structure in said memory to obtain existing director-style characteristics associated with said particular director;
      check said existing director-style characteristics associated with said particular director accessed from said director-style parameter data structure to determine if any existing director-style shot associated with said particular director have said at least one director-style characteristic associated with said current shot;

compare said at least one director-style characteristic associated with said current shot with said existing director-style characteristics associated with said particular director and associated with said existing director-style shot and if said current shot is not similar to any said existing director-style shot, accept inputs for processing component settings and store said processing component settings in said memory; and if said current shot is similar to any said existing director-style shot, retrieve said processing component settings associated with said existing director-style shot and store said processing component settings in said memory to convert said current shot from 2D to 3D format;

apply said processing component settings to said processing components;

convert said shot from said 2D to said 3D format;

accept any modifications to said processing component settings and update said director-style parameters data structure associated with said current shot.

2. The system of claim 1 wherein said director-style characteristic comprises camera characteristics, and wherein said camera characteristics comprise one or more of camera angle, camera motion, shot intimacy, actor positions, or any combination thereof.

3. The system of claim 2, wherein said camera motion comprises one or more of lock down, crane, tracking, handheld, tripod shot, or any combination thereof.

4. The system of claim 1 wherein said director-style characteristic comprises priority of progressive refinement processing, wherein said at least one computer is further configured to determine areas to spend more processing time than other areas of said shot.

5. The system of claim 1 wherein said director-style characteristic comprises lighting characteristics, and wherein said lighting characteristics are determined as one or more of foreground, midground, background, ground planes, sky domes, or any combination thereof.

6. The system of claim 1 wherein said director-style characteristic comprises lighting characteristics comprising a first brightness in an area of said one or more 2D format images that denotes a background distance.

7. The system of claim 1 wherein said director-style characteristic comprises lighting characteristics comprising a second brightness in an area of said one or more 2D format images that denotes a midrange distance.

8. The system of claim 1 wherein said director-style characteristic comprises lighting characteristics comprising a third brightness in an area of said 2D one or more format images that denotes a foreground distance.

9. The system of claim 1 wherein said director-style characteristic comprises color characteristics.

10. The system of claim 1 wherein said director-style characteristic comprises color characteristics comprising a first color and/or first saturation in an area of said one or more 2D format images that denotes a background distance.

11. The system of claim 1 wherein said director-style characteristic comprises color characteristics comprising a second color and/or second saturation in an area of said one or more 2D format images that denotes a midrange distance.

12. The system of claim 1 wherein said director-style characteristic comprises color characteristics comprising a third color and/or second saturation in an area of said one or more 2D format images that denotes a foreground distance.

13. The system of claim 1 wherein said at least one computer is further configured to operate in conjunction with a positive integer number of other computers to convert said movie from said 2D format images to said 3D format.

14. The system of claim 1 wherein said at least one computer is further configured to white balance a shot before said analyze said shot occurs.

15. The system of claim 1 wherein said at least one computer is further configured to obtain an order in which to execute said processing components.

16. The system of claim 1 wherein said at least one computer is further configured to tween processing component settings between keyframes.

17. The system of claim 16 wherein said at least one computer is further configured to store timing history of said processing component settings applied, wherein percentages of said processing component setting vary in time such that said at least one computer is further configured to automatically identify which processing component setting of said processing component settings to use in varying time based on said percentages and tween said processing component settings between keyframes based on said percentages.

18. The system of claim 1 wherein said at least one computer is further configured to display and obtain settings for workflow status values associated with said shot.

19. The system of claim 1 wherein said at least one computer is further configured to display and obtain a depth range for said one or more 2D format images.

20. The system of claim 1 wherein said at least one computer is further configured to utilize face recognition software to automatically apply depth to said one or more 2D format images.

21. The system of claim 1 wherein said at least one computer is further configured to utilize texture detection software to automatically apply depth to said one or more 2D format images.

22. The system of claim 1 wherein said at least one computer is further configured to ignore areas of an image that have been masked and add depth to areas of an image that have not been masked.

23. A system for director-style based 2D to 3D movie conversion comprising:

memory configured to store at least one director-style characteristic;

at least one computer configured to break a series of related images comprising a motion picture made by a particular director into one or more shots that each comprise one or more two-dimensional or 2D format images wherein said particular director is a particular person that directs said motion picture;

analyze a current shot selected from said one or more shots and determine at least one director-style characteristic associated with said current shot;

access a director-style parameters data structure in said memory to obtain existing director-style characteristics associated with said particular director;

check said existing director-style characteristics associated with said particular director accessed from said director-style parameter data structure to determine if any existing director-style shot associated with said particular director have said at least one director-style characteristic associated with said current shot;

compare said at least one director-style characteristic associated with said current shot with said existing director-style characteristics associated with said particular director and associated with said existing director-style shot and
if said current shot is not similar to any said existing director-style shot,
   accept inputs for processing component settings and store said processing component settings in said memory; and
if said current shot is similar to any said existing director-style shot,
   retrieve said processing component settings associated with said existing director-style shot and store said processing component settings in said memory to convert said current shot from 2D to 3D format;
apply said processing component settings to said processing components;
convert said shot from said 2D to said 3D format;
accept any modifications to said processing component settings and update said director-style parameters data structure associated with said current shot;
store timing history of said processing component settings applied, wherein percentages of said processing component setting vary in time such that said at least one computer is further configured to automatically identify which processing component setting of said processing component settings to use in varying time based on said percentages and tween said processing component settings between keyframes based on said percentages;
ignore areas of an image that have been masked and add depth to areas of an image that have not been masked; and
wherein said director-style characteristic comprises camera characteristics, lighting and priority of progressive refinement processing, and wherein
   said camera characteristics comprise one or more of camera angle, camera motion, shot intimacy, actor positions, or any combination thereof,
   said camera motion comprises one or more of lock down, crane, tracking, handheld, tripod shot, or any combination thereof,
   said lighting characteristics are determined as one or more of foreground, midground, background, ground planes, sky domes, or any combination thereof, and
   said at least one computer is further configured to determine areas to spend more processing time than other areas of said shot.

* * * * *